(12) United States Patent
Yan et al.

(10) Patent No.: US 11,288,709 B2
(45) Date of Patent: Mar. 29, 2022

(54) TRAINING AND UTILIZING MULTI-PHASE LEARNING MODELS TO PROVIDE DIGITAL CONTENT TO CLIENT DEVICES IN A REAL-TIME DIGITAL BIDDING ENVIRONMENT

(71) Applicant: Adobe Inc., San Jose, CA (US)

(72) Inventors: Zhenyu Yan, Cupertino, CA (US);
Chen Dong, San Matteo, CA (US);
Abhishek Pani, Sunnyvale, CA (US);
Yuan Yuan, San Jose, CA (US)

(73) Assignee: Adobe Inc., San Jose, CA (US)

( * ) Notice: Subject to any disclaimer, the term of this patent is extended or adjusted under 35 U.S.C. 154(b) by 279 days.

(21) Appl. No.: 15/938,449

(22) Filed: Mar. 28, 2018

(65) Prior Publication Data
US 2019/0303980 A1   Oct. 3, 2019

(51) Int. Cl.
*G06Q 30/02*   (2012.01)
*G06N 20/00*   (2019.01)

(52) U.S. Cl.
CPC ......... *G06Q 30/0275* (2013.01); *G06N 20/00* (2019.01); *G06Q 30/0242* (2013.01)

(58) Field of Classification Search
None
See application file for complete search history.

(56) References Cited

U.S. PATENT DOCUMENTS

| 7,305,363 | B1 * | 12/2007 | Sandholm | G06Q 30/08 705/26.3 |
| 7,680,746 | B2 * | 3/2010 | Agarwal | G06Q 10/00 706/12 |
| 7,908,238 | B1 * | 3/2011 | Nolet | G06N 7/005 706/52 |
| 8,719,082 | B1 * | 5/2014 | Snyder | G06Q 30/0275 705/14.1 |

(Continued)

OTHER PUBLICATIONS

* Perlich C, Dalessandro B, Raeder T, Stitelman O, Provost F. Machine learning for targeted display advertising: Transfer learning in action. Machine Learning 2013. Published online; to appear in print. DOI 10.1007/s10994-013-5375-2. (Year: 2013).*

(Continued)

*Primary Examiner* — Eric R Netzloff
(74) *Attorney, Agent, or Firm* — Keller Jolley Preece

(57) ABSTRACT

The present disclosure includes systems, methods, and non-transitory computer readable media that train and utilize multi-phase learning models to predict performance during digital content campaigns and provide digital content to client devices in a real-time bidding environment. In particular, one or more embodiments leverage organizational structure of digital content campaigns to train two learning models, utilizing different data sources, to predict performance, generate bid responses, and provide digital content to client devices. For example, the disclosed systems can train a first performance learning model in an offline mode utilizing parent-level historical data. Then, in an online mode, the disclosed systems can train a second performance (Continued)

learning model utilizing child-level historical data and utilize the first performance learning model and the second performance learning model to generate bid responses and bid amounts in a real-time bidding environment.

20 Claims, 8 Drawing Sheets

(56) References Cited

U.S. PATENT DOCUMENTS

| | | | | |
|---|---|---|---|---|
| 8,935,247 | B1* | 1/2015 | Tholome | G06F 16/355 707/736 |
| 10,366,403 | B2* | 7/2019 | Yu | G06Q 30/0206 |
| 10,482,474 | B1* | 11/2019 | Manber | G06Q 30/0256 |
| 10,482,496 | B1* | 11/2019 | Recce | G06Q 30/0275 |
| 2005/0246231 | A1* | 11/2005 | Shkedi | G06Q 30/02 705/14.73 |
| 2007/0078707 | A1* | 4/2007 | Axe | G06Q 30/02 705/14.41 |
| 2007/0239535 | A1* | 10/2007 | Koran | G06F 16/212 705/14.25 |
| 2010/0094673 | A1* | 4/2010 | Lobo | G06Q 30/0273 705/14.69 |
| 2011/0040611 | A1* | 2/2011 | Simmons | G06Q 30/0275 705/14.41 |
| 2011/0040635 | A1* | 2/2011 | Simmons | G06Q 30/0241 705/14.71 |
| 2011/0264511 | A1* | 10/2011 | Zhang | G06Q 30/02 705/14.43 |
| 2012/0022952 | A1* | 1/2012 | Cetin | G06Q 10/04 705/14.73 |
| 2012/0123857 | A1* | 5/2012 | Surve | G06Q 30/0241 705/14.49 |
| 2012/0143672 | A1* | 6/2012 | You | G06Q 30/0243 705/14.42 |
| 2013/0325590 | A1* | 12/2013 | Shekhawat | G06Q 30/0251 705/14.43 |
| 2014/0156379 | A1* | 6/2014 | Pani | G06Q 30/0242 705/14.41 |
| 2015/0066593 | A1* | 3/2015 | Huang | G06Q 30/0202 705/7.31 |
| 2015/0206180 | A1* | 7/2015 | Iyer | G06Q 30/0251 705/14.49 |
| 2015/0227964 | A1* | 8/2015 | Yan | G06Q 30/0244 705/14.43 |
| 2016/0371589 | A1* | 12/2016 | Golbandi | G06Q 30/0269 |
| 2017/0046347 | A1* | 2/2017 | Zhou | G06N 5/003 |

OTHER PUBLICATIONS

Hongxia Yang, Quan Lu, Angus Xianen Qiu, and Chun Han. 2016. Large Scale CVR Prediction through Dynamic Transfer Learning of Global and Local Features. In Proceedings of the 5th International Workshop on Big Data, Streams and Heterogeneous Source Mining: Algorithms, Systems, Programming Models and Applications. 103-119.

Kamelia Aryafar, Devin Guillory, and Liangjie Hong. 2017. An Ensemble-based Approach to Click-Through Rate Prediction for Promoted Listings at Etsy. In Proceedings of the 23rd ACM SIGKDD International Conference on Knowledge Discovery and Data Mining. Halifax, NS, Canada, 6 pages.

Quan Lu, Shengjun Pan, Liang Wang, Junwei Pan, Fengdan Wan and Hongxia Yang. 2017. A Practical Framework of Conversion Rate Prediction for Online Display Advertising. In Proceedings of the 23rd ACM SIGKDD International Conference on Knowledge Discovery and Data Mining. Halifax, NS, Canada, 9 pages.

Thore Graepel, Joaquin Quinonero Candela, Thomas Borchert, and Ralf Herbrich. 2010. Web-Scale Bayesian Click-Through Rate Prediction for Sponsored Search Advertising in Microsoft's Bing Search Engine. In Proceedings of the 27th International Conference on Machine Learning. 13-20.

H. Brendan McMahan, Gary Holt, D. Sculley, Michael Young, Dietmar Ebner, Julian Grady, Lan Nie, Todd Phillips, Eugene Davydov, Daniel Golovin, Sharat Chikkerur, Dan Liu, Martin Wattenberg, Arnar Mar Hrafnkelsson, Tom Boulos, and Jeremy Kubica. 2013. Ad Click Prediction: A View from the Trenches. In Proceedings of the 19th ACM SIGKDD International Conference on Knowledge Discovery and Data Mining. New York, NY, USA, 1222-1230.

Olivier Chapelle, Eren Manavoglu, and Romer Rosales. 2014. Simple and Scalable Response Prediction for Display Advertising. ACM Transactions on Intelligent Systems and Technology (TIST) 5, 4, Article 61, 34 pages.

* cited by examiner

TRAINING AND UTILIZING MULTI-PHASE LEARNING MODELS TO PROVIDE DIGITAL CONTENT TO CLIENT DEVICES IN A REAL-TIME DIGITAL BIDDING ENVIRONMENT

BACKGROUND

Recent years have seen significant improvement in hardware and software platforms for providing personalized digital content across computer networks to client devices of target users. For example, in response to receiving a search term from a target user, conventional systems can provide personalized digital content including digital assets from one or more content managers to a client device of the target user. For example, some conventional systems receive search terms from computing devices of target users and auction digital asset impression opportunities to one or more content managers within an integrated real-time digital bidding environment.

Conventional bidding systems, however, give rise to many problems with regard to real-time bidding on digital asset impression opportunities corresponding to client devices simultaneously navigating digital assets. For example, conventional systems are often inaccurate and unstable. For instance, conventional systems routinely generate inaccurate predictions of a measure of fit (or value) corresponding to a keyword search of a client device, and then inaccurately provide digital content to client devices based on these predictions. Specifically, conventional bidding systems attempt to predict the value of providing digital content to a client device based on specific, atom level, bid units corresponding to particular users. This data, however, is typically sparse and leads to inaccurate predictions (and unstable predictions with wide variability) in providing real-time digital content to client devices.

Additionally, conventional bidding systems are inefficient. For example, conventional bidding systems often make erroneous performance predictions associated with client devices that utilize particular search terms. This inevitably leads to the provision of digital assets to inappropriate target users and inefficient utilization of system resources in providing digital content to client devices. In addition, some conventional systems utilize trained models that take significant time and computing resources to tune and operate. The time and computing resources required for conventional systems are particularly problematic given the near-instantaneous demands within a real-time bidding environment of providing digital content to client devices as they navigate to different digital assets.

Moreover, conventional bidding systems are inflexible. For example, as mentioned above, conventional bidding systems generally focus on specific, bid-level units of data that are sparsely populated. Accordingly, the accuracy of conventional systems is rigidly tied to the amount of data available for similar bid-level units. This rigid approach leads to unstable and erroneous performance predictions and inaccurate provision of digital content across computer networks.

BRIEF SUMMARY

One or more embodiments of the present disclosure provide benefits and/or solve one or more of the foregoing or other problems in the art with systems, methods, and non-transitory computer readable storage media that train and utilize multi-phase learning models to accurately, efficiently, and flexibly predict performance during digital content campaigns and provide digital content to client computer devices in a real-time bidding environment. Specifically, in one or more embodiments, the disclosed systems leverage a hierarchical structure of digital content campaigns to train two learning models utilizing different data sources (and train/update the models at different times). For instance, in one or more embodiments, the disclosed systems train a first learning model with parent-level historical data corresponding to parent bidding parameters (e.g., historical data for high-level parent keywords) and train a second learning model with child-level historical data for child bidding parameters (e.g., historical data for low-level, child keywords). By utilizing multiple models trained with different data sources, the disclosed systems and methods can more accurately predict performance during digital content campaigns and generate targeted bid responses with improved efficiency, stability, and flexibility.

For example, in one or more embodiments, the disclosed systems identify a digital content campaign including a parent bidding parameter and a child bidding parameter associated with the parent bidding parameter. The disclosed systems and methods can generate a first performance learning model (e.g., when offline) based on parent-level historical data associated with the parent bidding parameter. Moreover, the disclosed systems and methods can generate a second performance learning model (e.g., when online or offline) based on historical data associated with the child bidding parameter. The disclosed systems can then (when online) utilize the first performance learning model to determine a parent-level performance metric and the second performance learning model to determine a child-level performance metric. Furthermore, in response to receiving a bid request, the disclosed systems can generate a bid response for providing digital content to a user client device based on the child-level performance metric and the parent-level performance metric.

Additional features and advantages of one or more embodiments of the present disclosure will be set forth in the description which follows, and in part will be obvious from the description, or may be learned by practice of such example embodiments.

BRIEF DESCRIPTION OF THE DRAWINGS

The detailed description is described with reference to the accompanying drawings in which.

DETAILED DESCRIPTION

Figure 1:
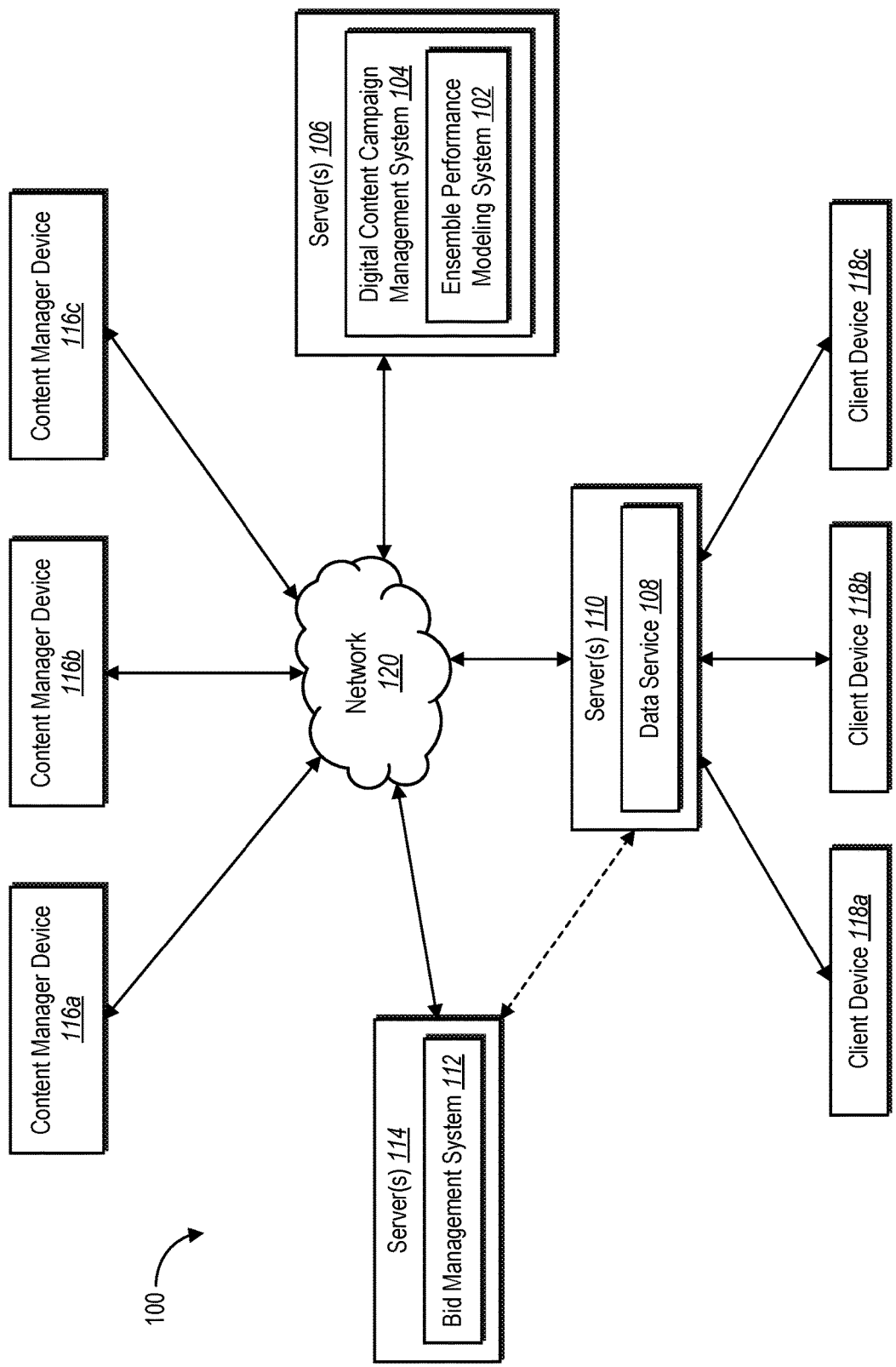
FIG. 1 illustrates an example environment in which an ensemble performance modeling system operates in accordance with one or more embodiments.

One or more embodiments of the present disclosure include an ensemble performance modeling system that trains and utilizes multi-phase learning models to predict performance during digital content campaigns and provide digital content to client computer devices in a real-time bidding environment. In particular, in one or more embodiments, the ensemble performance modeling system generates (e.g., in an offline phase) a high-level learning model utilizing historical data corresponding to a parent-level bidding parameter (e.g., a parent keyword). Moreover, the ensemble performance modeling system can generate (e.g., in an online phase) a low-level learning model utilizing historical data corresponding to a child-level bidding parameter (e.g., a child keyword). The ensemble performance modeling system can then utilize the high-level learning model and the low-level learning model (e.g., in the online phase) to respond to bid requests in a real-time bidding environment. For example, in response to receiving a bid request for a client device that enters a query with a child keyword, the ensemble performance modeling system can utilize both learning models to generate a bid amount and a bid response for providing digital content to the client device.

To illustrate, in one or more embodiments, the ensemble performance modeling system identifies a digital content campaign that includes a parent keyword and a child keyword. The ensemble performance modeling system can generate a first performance learning model based on parent-level historical data associated with the parent keyword. Moreover, the disclosed systems and methods can generate a second performance learning model based on child-level historical data associated with the child keyword. The disclosed systems can then utilize the first performance learning model to determine a parent-level performance metric and the second performance learning model to determine a child-level performance metric. In one or more embodiments, in response to receiving a bid request corresponding to the child keyword, the disclosed systems can generate a bid response (including a bid amount) for providing digital content to a user client device based on the child-level performance metric and the parent-level performance metric.

As just mentioned, in one or more embodiments, the ensemble performance modeling system identifies a digital content campaign that includes hierarchical bidding parameters. In particular, the ensemble performance modeling system can identify a parent bidding parameter (such as parameters for bidding on a parent keyword) and a child bidding parameter (such as parameters for bidding on a child keyword). For example, in a digital content campaign for providing digital content in response to search queries, the ensemble performance modeling system can identify a parent keyword (such as clothing) that encompasses a child keyword (such as shirt). In addition to keywords, the ensemble performance modeling system can utilize a variety of different types of hierarchical bidding parameters within an organizational structure of one or more digital content campaigns, such as parent/child demographic criteria (e.g., under 20 age demographic and age 15 demographic), and/or parent/child digital content (e.g., individual and groups ads or individual ad and ads that include a particular text).

Moreover, as mentioned, the ensemble performance modeling system can leverage the hierarchical structure of the digital content campaign to generate multiple different models utilizing different data sources (at different times). Indeed, as mentioned above, the ensemble performance modeling system can generate a first performance learning model based on historical data reflecting a parent bidding parameter and a second performance learning model based on historical data reflecting a child bidding parameter. For example, the ensemble performance modeling system can generate the first performance learning model based on historical user interactions with digital content provided in response to search queries that includes a parent keyword (and corresponding child keywords subsumed by the parent keyword). Moreover, the ensemble performance modeling system can generate the second performance learning model based on historical user interactions with digital content provided in response to a search query that includes the child keyword.

In addition, the ensemble performance modeling system can then utilize multiple performance learning models to generate performance metrics (e.g., predicted clicks, predicted generated revenue amount, or predicted revenue-per-click amount). For instance, the ensemble performance modeling system can utilize the first performance learning model to generate a parent-level performance metric (e.g., predicted clicks) based on historical data reflecting the parent keyword. Moreover, the ensemble performance modeling system can utilize the second performance learning model to generate a child-level performance metric (e.g., predicted clicks) based on historical data reflecting the child keyword.

Furthermore, the ensemble performance modeling system can utilize the parent-level performance metrics and the child-level performance metrics to respond to one or more bid requests. For example, when a client device conducts a search for the child keyword, the ensemble performance modeling system can receive a bid request to provide digital content to the client device. The ensemble performance modeling system can utilize the child-level performance metric and the parent-level performance metric to generate a bid response. Specifically, the ensemble performance modeling system can utilize the child-level performance metric and the parent-level performance metric to determine a bid amount and provide the bid amount as part of a bid response to the bid request. Moreover, the ensemble performance modeling system can provide digital content to the client device.

As mentioned above, the ensemble performance modeling system can also generate (e.g., train and/or update) performance learning models at different times. Indeed, the ensemble performance modeling system can train a first performance learning model based on parent bidding parameters in an offline mode. The ensemble performance modeling system can then update the first performance learning model in an online mode. Furthermore, the ensemble performance modeling system can generate (e.g., train and/or update) a second performance learning model based on child bidding parameters in one or both of an online mode and an offline mode.

For example, in one or more embodiments, the ensemble performance modeling system extracts parent-level historical data and trains a complex parent performance learning model in an offline mode (e.g., without simultaneously running a digital content campaign utilizing the parent performance learning model). Then, in an online mode (e.g., while running a digital content campaign), the ensemble performance modeling system extracts child-level historical data, utilizes a child performance learning model to determine a child-level performance metric based on the child-level data, and utilizes the trained parent performance learning model to determine a parent-level performance metric. In one or more embodiments, the ensemble performance modeling system continues to utilize the performance learning models in online mode until it is determined that the parent performance learning model should be re-trained. At that point, the ensemble performance modeling system can again re-train the parent performance learning model in offline mode.

As mentioned, the ensemble performance modeling system provides a number of advantages over conventional systems. For example, by utilizing two learning models trained utilizing parent-level historical data and child-level historical data the ensemble performance modeling system can improve accuracy and stability in determining performance metrics while executing a digital content campaign and can generate more accurate bid responses for providing digital content within a real-time bidding environment. For example, by utilizing both historical data corresponding to child bidding parameters and historical data corresponding to parent bidding parameters, the ensemble performance modeling system can avoid data sparsity problems associated with conventional systems and more accurately determine a value of a particular impression opportunity corresponding to a bid request. Moreover, the ensemble performance modeling system can more accurately generate bid responses and corresponding bid amounts.

In addition, the ensemble performance modeling system also improves efficiency and stability. For example, by more accurately determining value of one or more impression opportunities, the ensemble performance modeling system can avoid or reduce provision of digital assets to inappropriate target users and reduce utilization of systems resources in providing digital content to client devices. In addition, by training a first (e.g., more complex) parent-level model in an offline stage, the ensemble performance modeling system can improve the speed of systems responding to bid requests in a real-time bidding environment. Indeed, in one or more embodiments, the ensemble performance modeling system can operate in real-time by generating a bid response and providing digital content to client devices within milliseconds of identifying an impression opportunity (e.g., within milliseconds of a client device accessing a digital asset and/or providing a search query).

Furthermore, the ensemble performance modeling system also improves flexibility. Indeed, the ensemble performance modeling system can consider multiple models based on historical data for parent bidding parameters and child bidding parameters. Accordingly, the ensemble performance modeling system avoids rigid application of specific, bid-level units as utilized by conventional systems.

As illustrated by the foregoing discussion, the present disclosure utilizes a variety of terms to describe features and advantages of the ensemble performance modeling system. Additional detail is now provided regarding the meaning of such terms. For example, as used herein, the term "digital content campaign" refers to actions, rules, and/or processes for disseminating one or more digital content items. In particular, a digital content campaign includes one or more content items (e.g., advertisements) and one or more campaign parameters, such as bidding parameters, for disseminating the one or more digital content items to client devices. To illustrate, a digital content campaign includes a digital content item together with campaign parameters for bidding on impression opportunities, sending content items to client devices, or targeting particular client devices and/or users.

As mentioned above, a digital content campaign can include a hierarchical structure of bidding parameters. As used herein, the term "bidding parameter" refers to a characteristic utilized in generating, providing, submitting, and/or creating a bid (e.g., bid response). In particular, a bidding parameter includes a characteristic utilized to determine whether to (or how much to) bid on an impression opportunity (i.e., an opportunity to provide digital content to a client device accessing digital content, such as an advertising slot on a website). For example, a bidding parameter can include a keyword (e.g., a certain keyword in a search query will prompt a bid), demographic information (e.g., a person of a certain age corresponding to an impression opportunity will prompt a bid), computer characteristics (e.g., a computing device utilizing a certain browser will prompt a bid), location information (e.g., a computing device accessing a digital asset from a particular location will prompt a bid), media properties (e.g., computing devices accessing particular websites will prompt a bid), or digital content characteristics (e.g., contents of digital content or groups of digital content can prompt a bid).

A digital content campaign can include a structure of bidding parameters, including parent bidding parameters and child bidding parameters (or child parameters). As used herein, the term "parent bidding parameter" or "parent parameter" refers to a bidding parameter that encompasses, includes, or subsumes (e.g., is broader than) one or more child bidding parameters. Similarly, a "child bidding parameter" or "child parameter" is a bidding parameter encompassed by or subsumed by (e.g., is narrower than) a parent bidding parameter. For example, a parent bidding parameter can include a parent keyword (e.g., clothes) that encompasses a child keyword (e.g., shirt). Similarly, a parent demographic (e.g., people under 40) can encompass a child demographic (e.g., people between 20 and 25). Moreover, parent digital content (e.g., a group of ads in digital content campaign that include the same text) can encompass child digital content (e.g., a single ad in the digital content campaign). A parent bidding parameter and/or child bidding parameter can include multiple different types of characteristics. For example, a parent bidding parameter can include a keyword and/or a demographic (e.g., a search for "cars" by a male) and a child bidding parameter can include a more specific keyword and/or demographic (e.g., a search for "sports coupe" by a male between 30 and 40).

In one or more embodiments, the ensemble performance modeling system utilizes historical performance data associated with bidding parameters. As used herein "historical performance data" refers to digital data that indicates user interactions associated with digital content. In particular, historical performance data includes user interactions associated with digital content providing in response to a bid request (e.g., for an impression opportunity). For example, historical performance data includes click-throughs associated with digital content provided to a client device, revenue-per-click associated with digital content provided to a client device, and other conversions associated with digital content provided to a client device.

Historical performance data may be organized into "parent-level historical data" or "child-level historical data". As used herein, "parent-level historical data" refers to historical performance data associated with a parent bidding parameter. In at least one embodiment, because a parent bidding parameter subsumes all of its associated child bidding parameters, the parent-level historical data associated with the parent bidding parameter also includes historical performance data associated with each child bidding parameter subsumed by the parent bidding parameter. As used herein, "child-level historical data" refers to historical performance data associated with the child bidding parameter.

Moreover, in at least one embodiment, the ensemble performance modeling system 102 maintains performance data for a threshold amount of time (e.g., one minute, ten minutes, one hour) before storing the performance data as historical performance data. Thus, the ensemble performance modeling system 102 periodically accesses "updated data" or "updated performance data." As used herein, "updated data" or "updated performance data" refers to performance data collected or identified since a reference time (e.g., the time that the ensemble performance modeling system last stored performance data as historical performance data).

In one or more embodiments, the ensemble performance modeling system 102 generates and utilizes at least two different performance learning models in generating bid responses. As used herein, a "performance learning model" refers to a computer-implemented procedure or algorithm that receives inputs and generates a performance metric. In particular, the ensemble performance modeling system can generate (e.g., train or update) a performance learning model with historical performance data to generate a performance metric.

For example, a performance learning model can be a machine-learning model (e.g., a neural network, deep learning model, linear regression model, decision tree) with parameters that can be tuned based on historical performance data to approximate unknown functions and generate a performance metric. In one or more embodiments, the ensemble performance modeling system trains a performance learning model against expected performance metric outputs (e.g., via feed-forward back-propagation, or any other machine model training technique) such that the performance learning model can generate a performance metric in response to data bid request (e.g., keywords and/or characteristics of an impression opportunity).

A performance learning model can also include less complex computer-implemented procedures or algorithms for outputting performance metrics. For example, the ensemble performance modeling system can generate a performance learning model such as averages, weighted averages, or means that are generated (e.g., trained or updated) with performance data to generate a performance prediction.

As just discussed, a performance learning model outputs a performance metric. As used herein, a "performance metric" refers to a value that reflects how a digital content item has performed (or will perform). In particular, a performance metric includes a value that indicates a measure of user interaction with a digital content item when the digital content item is provided to a client device of the user. For example, a performance metric can include, but is not limited to, revenue-per-click amount, generated revenue amount, number of clicks, or cost-per-click amount.

In one or more embodiments, the ensemble performance modeling system 102 determines a performance metric in a digital content campaign at both the child-level and at the parent-level. As used herein, a "child-level performance metric" refers to a performance metric generated based on child-level data (e.g., based on a child performance learning model). As used herein, a "parent-level performance metric" refers to a performance metric generated based on parent-level data (e.g., based on a parent performance learning model).

As mentioned above, the ensemble performance modeling system 102 receives bid requests from a bid management system and generates a bid response. As used herein, a "bid request" refers to an electronic communication that specifies an impression opportunity. In particular, a "bid request" can include keyword and/or characteristics associated with a search query from a client device, a website accessed by a client device, or an electronic document accessed by a client device. As used herein, an "impression opportunity" refers to an opportunity to provide digital content to a client device accessing a digital asset. For instance, an impression opportunity can include an advertising slot in a digital asset such as a web site or electronic document. An impression opportunity generally arises when a client device accesses a digital asset or submitted a search query. As used herein, a "bid response" refers to an electronic communication that responding to a bid request. In particular, a "bid response" include an electronic communication that comprises a bid amount and/or a digital content item to provide in response to a bid request.

As mentioned above, the ensemble performance modeling system 102 can operate in an online mode, in an offline mode, or in both online and offline modes. As used herein, "offline mode" (or "offline" or "offline phase") refers to an operational phase prior to receiving a request for a performance metric (e.g., prior to a bid request). Moreover, offline includes an operational phase prior to the initiation of a digital content campaign. Additionally, the ensemble performance modeling system 102 can operate in offline mode in response to a determination that one or more performance learning models need to be re-trained. As outlined in greater detail below, when operating in offline mode, the ensemble performance modeling system can train a parent performance learning model. In an offline mode, the ensemble performance modeling system can perform more cumbersome tasks in terms of time and processing burden. For example, in offline mode, the ensemble performance modeling system 102 can extract large volumes of parent-level historical performance data and train complex performance learning models (e.g., such as machine-learning models).

As used herein, "online mode" refers to an operational phase in response to receiving a request for a performance metric (e.g., in response to a bid request received in real-time or in response to a request for a performance metric based on an automatic schedule). In one or more embodiments, the ensemble performance modeling system 102 operates in online mode while a digital content campaign is initiated and running (executing). Generally, when operating in online mode, the ensemble performance modeling system 102 performs tasks that are fast and require few computational resources. For example, in online mode, the ensemble performance modeling system can run or otherwise utilize less-complex performance learning models such as generating a child-level performance learning model (or updating a previously-trained parent-level performance learning model).

Additional detail regarding the ensemble performance modeling system will now be provided in relation to illustrative figures. For example, FIG. 1 illustrates an example environment 100 in which an ensemble performance modeling system 102 can operate. For example, as shown in FIG. 1, the environment 100 includes the ensemble performance modeling system 102 operating as part of a digital content campaign management system 104 on the server(s) 106. Additionally, the environment 100 includes the data service 108 hosted by the server(s) 110, and the bid management system 112 hosted by the server(s) 114. Furthermore, the environment 100 includes the content manager devices 116a, 116b, and 116c, and the client devices 118a, 118b, 118c. Moreover, the environment 100 also includes the network 120 that connects, the content manager devices 116a-116c, the client devices 118a-118c, the data service 108, the bid management system 112, and the ensemble performance modeling system 102. Additional information regarding the network 120 is provided below in reference to FIG. 8.

Any of the client devices 118a-118c (or the content manager devices 116a-116c) may include a computing device such as a desktop computer, a notebook or laptop computer, a netbook, a tablet computer, an e-book reader, a GPS device, a camera, a personal digital assistant (PDA), a handheld electronic device, a cellular telephone, a smartphone, other suitable electronic device, or any suitable combination thereof (as described in greater detail below in relation to FIG. 8). Moreover, each of the client devices 118a-118c and the content manager devices 116a-116c can access and/or communicate with the server(s) 106, 110, 114.

In one or more embodiments, the server(s) 106 (or the server(s) 110 or 114) may include a variety of servers, sub-systems, programs, modules, logs, and data stores. In particular embodiments, the server(s) 106 (or the server(s) 110 or 114) may include one or more of the following: a web server, action logger, API-request server, relevance-and-ranking engine, content-object classifier, notification controller, action log, third-party-content-object-exposure log, inference module, authorization or privacy server, search module, advertisement-targeting module, user-interface module, user-profile store, connection store, third-party content store, or location store. Additional detail regarding the server(s) 106, 110, 114 are provided below (e.g., in relation to FIG. 8).

In one or more embodiments, the data service 108 provides personalized digital content to the client devices 118a-118c in response to impression opportunities (e.g., in response to a client device accessing a website with an ad slot). For example, in response to identifying a web query including one or more search terms or key words from the client device 118a, the data service 108 can provide digital content (e.g., hyperlinks, descriptions, images, videos) associated with the search terms or keywords for display to the client device 118a. Additionally, in response to receiving the query, the data service 108 can provide targeted digital content (e.g., sponsored hyperlinks, digital advertisements) from at least one of the content manager devices 116a-116c to the client device 118a. In at least one embodiment, the data service 108 determines digital content to provide in response to a received search term or keyword based on the outcome of a real-time auction.

In particular, in one or more embodiments, the bid management system 112 conducts a real-time auction. For example, in response to a notification from the data service 108 of an impression opportunity (e.g., that a client device has accessed a digital asset or submitted a search query), the bid management system 112 initiates a real-time auction by requesting bids from the content manager devices 116a-116c on the impression opportunity (e.g., based on the keywords and/or characteristics associated with a received query). After determining a winning bid, the bid management system 112 notifies the data service 108 to provide one or more digital assets associated with the winning bidder (e.g., the winning content manager) for display to the client device 118a. In at least one embodiment, the bid management system 112 can be included in the data service 108. Alternatively, the bid management system 112 may be a third-party system utilized by the data service 108.

As shown in FIG. 1, the environment 100 also includes the server(s) 106 that include a digital content campaign management system 104. The digital content campaign management system 104 can manage, operate, run, and/or execute a digital content campaign (e.g., in conjunction with the ensemble performance modeling system 102 as shown). For example, the digital content campaign management system 104 can receive from the content manager devices 116a-116c digital content (e.g., an online ad) and campaign parameters (such as bidding parameters, a budget, or a campaign run time). The digital content campaign management system 104 (in conjunction with the ensemble performance modeling system 102) can execute the digital content campaign by providing the digital content and responding to bid requests in accordance with the campaign parameters.

As shown in FIG. 1, the digital content campaign management system 104 includes the ensemble performance modeling system 102. The ensemble performance modeling system 102 generates bid responses that include a suggested bid amount that reflects a performance prediction associated with an impression opportunity (e.g., based on keywords and/or characteristics of an impression opportunity). In other words, the ensemble performance modeling system 102 generates a performance prediction associated with the keyword and/or characteristics of an impression opportunity and predicts the value (to a content manager) of providing digital assets to the client device associated with the impression opportunity.

For example, in response to detecting an impression opportunity at the client device 118a, the bid management system 112 generates a bid request including the keyword and/or characteristics associated with the received search query. The bid management system 112 then provides the bid request to the ensemble performance modeling system 102 (either directly or via the content manager device 116a). Utilizing hierarchical bidding parameters from the digital content campaign provided by content manager device and historical performance data, the ensemble performance modeling system 102 utilizes two learning models to predict a parent-level performance metric and a child-level performance metric. The ensemble performance modeling system 102 also utilizes the parent-level performance metric and the child-level performance metric to generate a bid response including a suggested bid amount for the impression opportunity. In one or more embodiments, the ensemble performance modeling system 102 provides the generated bid response to the content manager device 116a or directly to the bid management system 112.

In response to receiving bid amounts (e.g., from each of the content manager devices 116a-116c or the digital content campaign management system 104), the bid management system 112 determines a winning bid. The bid management system 112 then informs the data service 108 of the winning content manager device. In one or more embodiments, the data service 108 accesses digital content for the winning bidder (e.g., the winning content manager) and provides the digital content for display to the client device 118a.

In one or more embodiments, the components of the ensemble performance modeling system 102 may be located on, or implemented by, one or more computing devices. For example, in some embodiments, the ensemble performance modeling system 102 is implemented as part of the digital content campaign management system 104 on the server(s) 106. Alternatively, the ensemble performance modeling system 102 may be installed as a native application, a web browser plugin, or another type of application plugin (e.g., a social media application plugin) on one of the content manager devices 116a-116c. Moreover, although FIG. 1 illustrates the server(s) 106, 110, and 114 as being separate, they can be implemented in the same set of server devices. For example, in one or more embodiments, the bid management system 112 and the data service 108, are implemented as part of the digital content campaign management system 104 on the server(s) 106.

As mentioned above, in one or more embodiments, the ensemble performance modeling system 102 leverages the organizational structure of one or more digital content campaigns to generate multiple performance learning models. In particular, the ensemble performance modeling system 102 can identify parent-level historical data corresponding to parent bidding parameters and child-level historical data corresponding to child bidding parameters and train multiple performance learning models based on the different data sets. For example, FIG. 2 illustrates analyzing historical performance data corresponding to one or more digital content campaigns to generate parent-level and child-level historical data sets in accordance with one or more embodiments.

Figure 2:
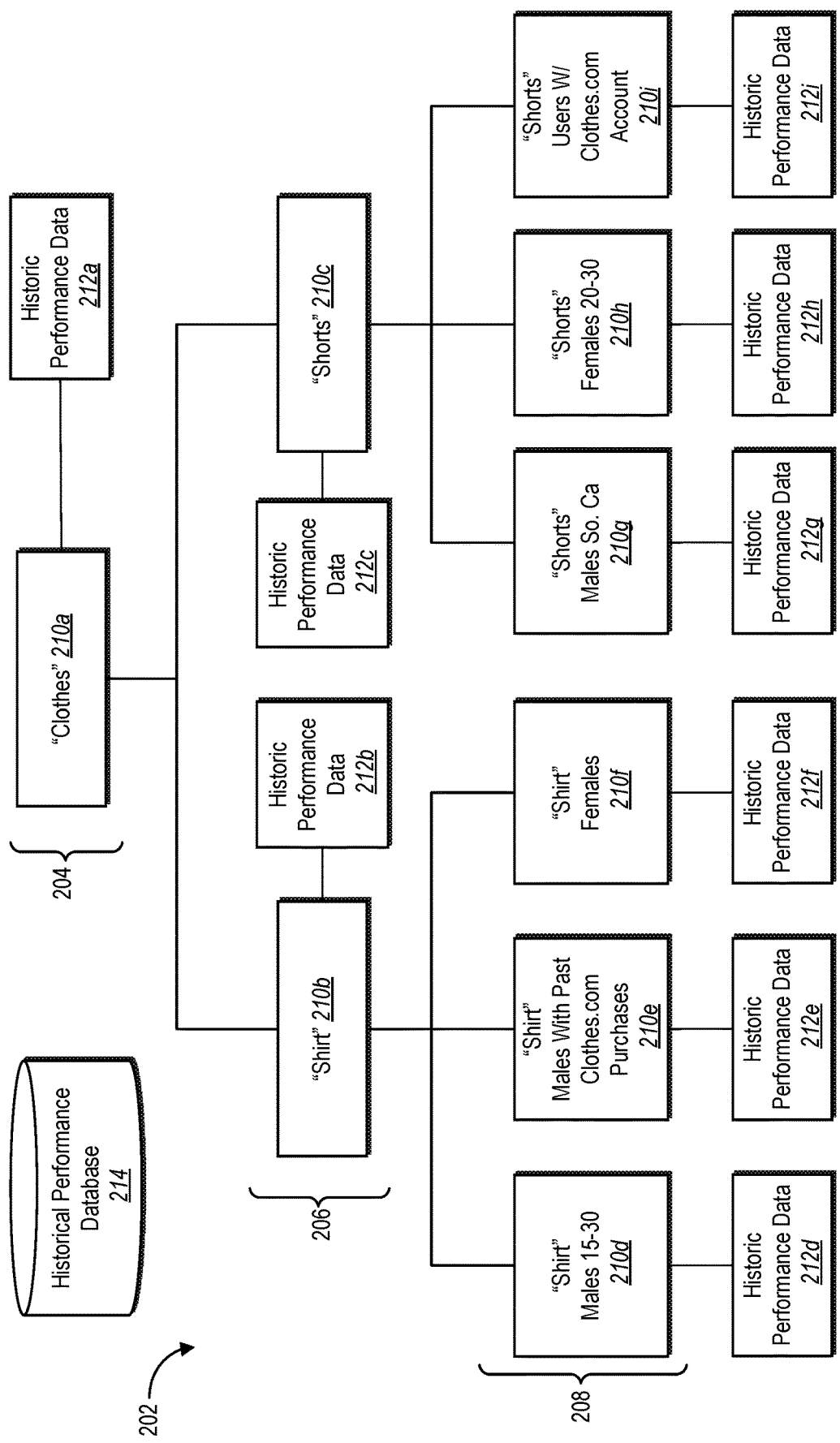
FIG. 2 illustrates an example digital content campaign ensemble performance modeling system in accordance with one or more embodiments.

In particular, FIG. 2 illustrates a historical performance database 214 and example bidding parameters 202 of one or more digital content campaigns. As shown in FIG. 2, the ensemble performance modeling system 102 utilizes the bidding parameters 202 to generate historical performance data sets 212a-212i from the historical performance database 214. Specifically, the ensemble performance modeling system 102 generates historical performance data sets 212a-212i at different levels of generality/specificity corresponding to the bidding parameters 202.

For example, as shown in FIG. 2 the bidding parameters 202 include a first level 204 including a bidding parameter 210a, a second level 206 including bidding parameters 210b-210c, and a third level 208 including bidding parameters 210d-210i. Specifically, the bidding parameter 210b in the second level 206 of the bidding parameters 202 is a parent bidding parameter of the bidding parameters 210d, 210e, and 210f in the third level 208 of the bidding parameters 202. Indeed, the parent bidding parameter subsumes (is more general than) the child bidding parameters. Similarly, the bidding parameters 210d, 210e, and 210f are child bidding parameters of the bidding parameter 210b. Additionally, the bidding parameter 210a in the first level 204 is a parent bidding parameter to the bidding parameters 210b, 210c in the second level 206.

The ensemble performance modeling system 102 can identify the bidding parameters 202 and the levels 204-208 by analyzing digital content campaigns, the historical performance database 214, and/or individual impression opportunities/bid requests. For example, the ensemble performance modeling system 102 can receive campaign parameters (e.g., from the content manager device 116a) that include the bidding parameters 202 and the levels 204-206.

In one or more embodiments, the ensemble performance modeling system 102 determines one or more of the bidding parameters from the historical performance database 214. For example, the ensemble modeling system 102 can analyze the historical performance database 214 to identify previous keywords and/or characteristics corresponding to previous impression opportunities. The ensemble performance modeling system 102 can utilize these previous keywords and/or characteristics as the bidding parameters 202 and arrange the previous keywords and/or characteristics in the levels 204, 206, 208.

The ensemble performance modeling system 102 can also analyze individual impression opportunities (e.g., in real-time as they are received) to determine the bidding parameters 202 and/or the levels 204-206. For example, in one or more embodiments, the ensemble performance modeling system 102 analyzes keywords and characteristics of an impression opportunity and utilizes the particular keywords and characteristics of the impression opportunity at the third level 208 (e.g., as a specific bid-level unit).

As mentioned above, in addition to identifying the bidding parameters 202, the ensemble performance modeling system 102 can also identify historical performance data corresponding to the bidding parameters from the historical performance database 214. In particular, the ensemble performance modeling system 102 can identify previous impression opportunities from the historical performance database 214 that reflect individual bidding parameters and historical performance data sets reflecting those impression opportunities.

The historical performance database 214 includes data regarding prior impression opportunities/bid requests. For instance, the historical performance database 214 includes keywords and other characteristics corresponding to impression opportunities/bid requests, in addition to bid responses (e.g., bid amounts), digital content provided to client devices, and/or results from providing the digital content to the client devices (e.g., clicks, purchases, views, or other user interaction with the digital content).

In one or more embodiments, the ensemble performance modeling system 102 generates the historical performance database 214. For example, over time, the ensemble performance modeling system 102 monitors impression opportunities and digital content provided to client devices to collect performance data associated with bidding parameters. For example, the ensemble performance modeling system 102 can monitor performance of digital content provided for an impression opportunity and record keywords, user characteristics (e.g., demographics, locations, etc. of users of the client devices 118a-118c), and conversions (e.g., links clicked, revenue generated, pages visited).

In at least one embodiment, the data service 108 stores this performance data in relation to one or more bidding parameters. For example, the bidding parameter 210d in the third level 208 of the bidding parameters 202 includes performance data associated with the keyword "shirt" and the demographic characteristic "males aged 15-30." Accordingly, in response to receiving a query including the keyword "shirt" from a user who corresponds to the demographic characteristic "males aged 15-30," the ensemble performance modeling system 102 can store the query, keywords, and results in relation to these bidding parameters.

Utilizing the historical performance database 214, the ensemble performance modeling system 102 can generate the historical performance data sets 212a-212i. In particular, the ensemble performance modeling system 102 can search (e.g., filter) the historical performance database based on one or more bidding parameters and utilize the resulting information as a historical performance data set. To illustrate, in relation to the bidding parameter 210e, the ensemble performance modeling system 102 can search the historical performance database 214 for impression opportunities/bid requests that include the keyword "shirt" in a search query by a computing device of a user that is male with past "Clothes.com" purchases. The ensemble performance modeling system 102 can utilize the resulting performance data as the historical performance data set 212e.

In this manner, the ensemble performance modeling system 102 can generate parent-level historical performance data sets and child-level historical performance data sets. For example, for the parent bidding parameter 210a, the ensemble performance modeling system 102 can generate the parent-level historical data set 212a (by filtering the historical performance database 214 for impression opportunities that utilize the search term "clothes," "shirt," or "shorts."). Similarly, for the child bidding parameter 210f, the ensemble performance modeling system 102 can generate the child-level historical data set 212f (by filtering the historical performance database 214 for impression opportunities that utilize search term "shirt" from a computing device of a female user).

Although the embodiment of FIG. 2 illustrates a particular structure of bidding parameters for one or more digital content campaigns, the ensemble performance modeling system 102 can utilize any variety of bidding parameters. For example, in addition to keywords and demographic data, the ensemble performance modeling system 102 can also utilize digital content. For example, the ensemble performance modeling system 102 can generate a parent historical performance data set based on impression opportunities corresponding to a collection of different digital content items (e.g., a group of ads). The ensemble performance modeling system 102 can also generate a child historical performance data based on impression opportunities corresponding to a single digital content item from the collection of different digital content items (e.g., a single ad).

Additionally, the ensemble performance modeling system 102 can utilize any combination of different bidding parameters. For example, the bidding parameters 210a-210c in the bidding parameters 202 comprise keywords but no demographic characteristics, while the bidding parameters 210d-210i comprise keywords and demographic characteristics. Bidding parameters at a particular level of a hierarchical organization can include any type or parameters, including, for example, keywords, characteristics, and/or or digital content.

Moreover, although a certain hierarchical organization is shown in FIG. 2, the ensemble performance modeling system 102 can utilize a different organization. Indeed, the ensemble performance modeling system 102 can utilize any number of levels and bidding parameters (balanced or unbalanced).

As discussed above, the ensemble performance modeling system 102 can utilize two performance learning models to determine a performance metric, generate a bid response, and provide digital content to a client device. In particular, the ensemble performance modeling system 102 can train a parent performance learning model (e.g., when offline) and a child performance learning model (e.g., when online and/or offline) and utilize the parent performance learning model and the child performance learning model to generate a performance prediction and bid response. For example, FIG. 3 illustrates a sequence diagram of the ensemble performance modeling system 102 predicting a performance metric for a bidding parameter (a keyword), generating a bid response, and providing digital content in accordance with one or more embodiments.

Figure 3:
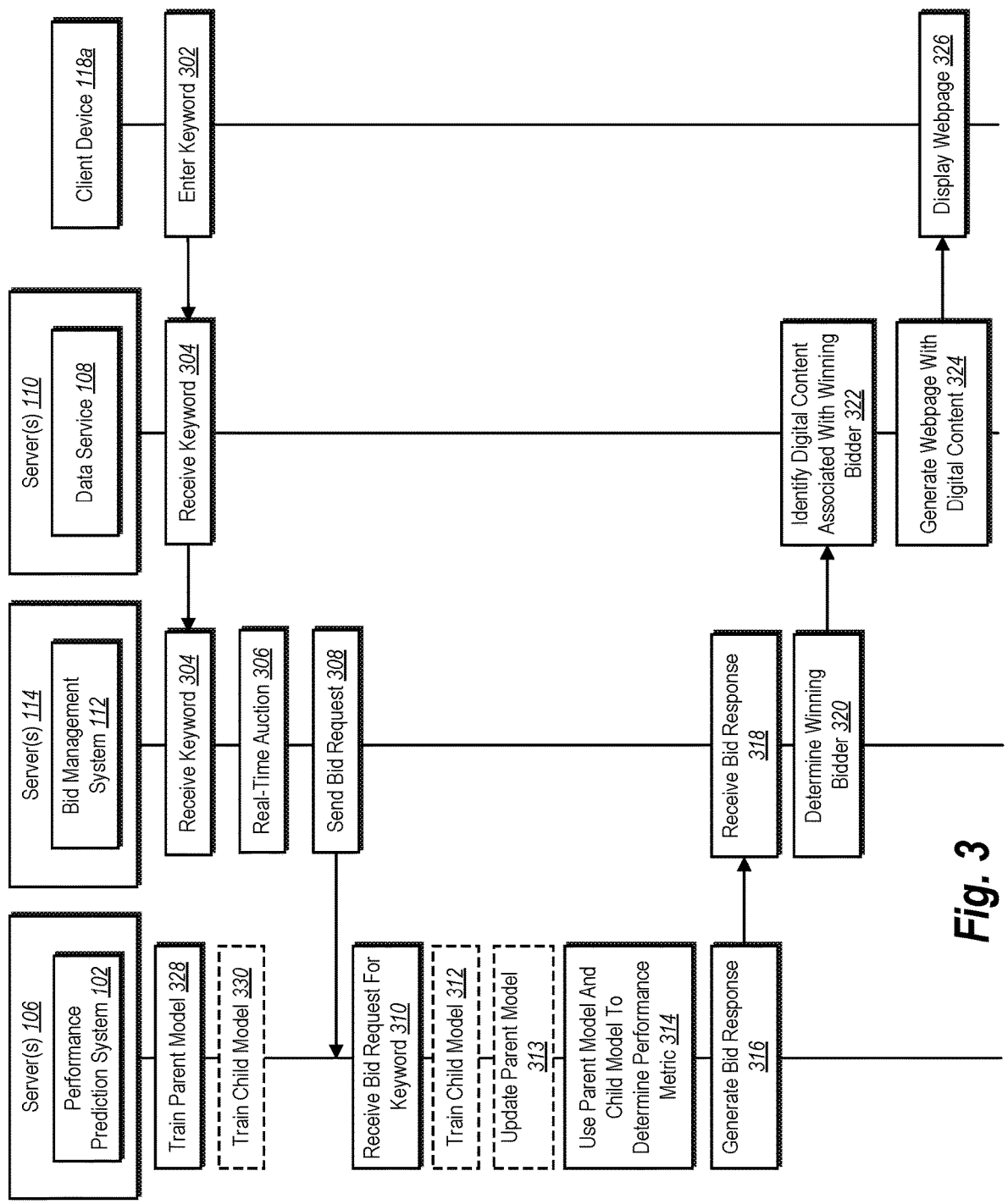
FIG. 3 illustrates an example overview of ensemble performance modeling system generating a bid response in accordance with one or more embodiments.

As shown in FIG. 3, the ensemble performance modeling system 102 (via the server(s) 106) can perform an act 328 of training a parent performance learning model and an act 330 of training a child performance learning model. For example, the ensemble performance modeling system 102 can perform the act 328 by identifying a parent-level historical data set for a parent bidding parameter, such as a parent keyword (e.g., as described in FIG. 2). The ensemble performance modeling system 102 can then train the parent performance learning model based on the parent-level historical data set. Additional detail regarding training the parent performance learning model is provided below (e.g., in relation to FIGS. 4, 5).

Similarly, the ensemble modeling system 102 can perform the act 330 by identifying a child-level historical data set for a child bidding parameter, such as a child keyword (e.g., as described in FIG. 2). The ensemble performance modeling system 102 can then train the child performance learning model based on the child-level historical data set. Additional detail regarding training the child performance learning model is provided below (e.g., in relation to FIGS. 4, 5).

As described, above, the ensemble performance modeling system 102 can apply the parent performance learning model and the child performance learning model to determine a performance metric for an impression opportunity. For example, as shown in FIG. 3, the client device 118a performs the act 302 of entering a keyword as part of a search query. The bid management system 112 (e.g., via the data service 108) performs the act 304 of receiving (or identifying) the keyword. In particular, the bid management system 112 can perform the act 304 by identifying an impression opportunity corresponding to the search and collecting characteristics associated with impression opportunity, such as the keyword, demographic characteristics, or session characteristics (e.g., the time and date associated with the search query, the geographical area where the search query originated).

With the keyword and associated characteristics, the bid management system 112 (via the server(s) 114) performs the act 306 of initiating a real-time auction. Moreover, as shown, the bid management system 112 performs the act 308 of sending a bid request. In particular, the bid management system 112 can generate a bid request that includes the keyword, demographic characteristics, or session characteristics to the ensemble performance modeling system 102 and send the bid request to the ensemble performance modeling system 102. The bid request can also include a bidding deadline (e.g., typically in milliseconds).

In response to receiving the bid request (310), the ensemble performance modeling system 102 performs the act 312 of training the child performance learning model. In particular, the ensemble performance modeling system 102 can perform the act 312 by updating (e.g., re-training) the child performance learning model determining a performance metric prediction associated with the keyword. For example, while executing the digital content campaign, the ensemble performance modeling system 102 can identify updated child-level historical data and train the child performance learning model utilizing the updated child-level historical data. Additional detail regarding online training of the child performance learning model is provided below (e.g., in relation to FIG. 5).

In one or more embodiments, in addition to training the child performance learning model, the ensemble performance modeling system 102 performs the act 313 of updating the parent performance learning model. In particular, the ensemble performance modeling system 102 can perform the act 313 by extracting updated parent data and applying the updated parent data to the parent performance learning model. In at least one embodiment, updating the parent performance learning model may include re-training the parent performance learning model with the updated parent data. Additional detail regarding updating the parent performance model is provided below (e.g., in relation to FIGS. 4 and 5).

As shown in FIG. 3, the ensemble performance modeling system 102 also performs the act of utilizing the parent performance learning model and the child performance learning model to determine a performance metric. In particular, the ensemble performance modeling system 102 generates a child-level performance metric utilizing the child performance learning model and generates a parent-level performance metric utilizing the parent performance learning model. The ensemble performance modeling system 102 then generates the performance metric based on the parent-level performance metric and the child-level performance metric. Additional detail regarding generating a performance metric utilizing a parent performance model and child performance model is provided below (e.g., in relation to FIGS. 5, 6).

After determining the performance metric prediction, the ensemble performance modeling system 102 performs the act 316 of generating a bid response. For example, in one or more embodiments, the ensemble performance modeling system 102 utilizes the predicted performance metric to determine a suggested bid amount. To illustrate, if the desired performance metric is revenue-per-click, and the predicted performance associated with that metric is high (e.g., indicating that the keyword and associated characteristics are valuable), the ensemble performance modeling system 102 may determine a suggested bid amount that is proportionally higher. Similarly, if the predicted performance associated with the metric is low (e.g., indicating that the keyword and associated characteristics are not valuable), the ensemble performance modeling system 102 may determine a suggested bid amount that is proportionally lower.

To further illustrate, if the predicted performance metric is revenue, the ensemble performance modeling system 102 can generate a bid amount based on the predicted revenue. For instance, the ensemble performance modeling system 102 can set the bid amount as a percentage of predicted revenue (e.g., 0.4 of predicted revenue for the impression opportunity).

In response to receiving a bid response (at the act 318) from the ensemble performance modeling system 102, the bid management system 112 can perform the act 320 of determining an auction winner. For example, in one or more embodiments, the bid management system 112 determines the auction winner by identifying the highest received bid (e.g., content manager associated with the highest received bid). In at least one embodiment, the bid management system 112 provides the winning bidder to the data service 108. In one or more embodiments, the bid response also includes an indication of digital content to provide to the client device 118. The bid management system 112 can also provide the indication of the digital content to the data service 108.

After receiving the identity of the winning bidder, the data service 108 performs the act 322 of identifying one or more digital content items associated with the winning bidder. For example, in one embodiment, the data service 108 may maintain a library of digital assets associated with content managers. In an alternative embodiment, the data service 108 may receive one or more digital assets directly from the winning content manager, the ensemble performance modeling system 102, and/or the bid management system 112.

After identifying the one or more digital assets associated with the winning content manager, the data service 108 generates a web page of search query results and associates one or more impression opportunities in the generated web page with the identified digital assets (324). For example, the search query results web page may include open interface elements (impression opportunities) along the top and sides of the page (e.g., banner advertisement space). In that embodiment, the data service 108 can provide the winning content manager's digital content via the open interface elements. In particular, the data service 108 can perform the act 326 of providing the generated web page to the client device 118a for display.

The method described in relation to FIG. 3 is intended to be illustrative of one or more methods in accordance with the present disclosure and is not intended to limit potential embodiments. Alternative embodiments can include additional, fewer, or different acts than those articulated in FIG. 3. For example, one or more embodiments do not include the act 313 (or the act 312). In addition, while the embodiment illustrated in FIG. 3 shows the ensemble performance modeling system 102 generating bid responses in connection with a search engine-type data service 108 that provides web page displays, other embodiments are also possible. For example, in one alternative embodiment, the data service 108 may be a social media system that provides digital assets in connection with user characteristics as part of a social media display. In that embodiment, the process illustrated in FIG. 3 would begin with the client device 118a requesting a web page (e.g., landing on a web page) associated with the social media system.

Similarly, although FIG. 3 illustrates determining a performance metric (e.g., the acts 312-314) in response to a particular request (e.g., a bid request), the ensemble performance modeling system 102 can determine a performance metric in response to a variety of requests. For example, in one or more embodiments, the ensemble performance modeling system 102 performs the acts 312-314 in response to a request from a content manager device for a predicted performance metric (e.g., a request for cost, revenue, clicks per revenue, etc. for a future or ongoing digital content campaign). The ensemble performance modeling system 102 can generate and provide a determined performance metric for display to the content manager device. Similarly, in one or more embodiments, the bid management system 112 notifies the content manager device of an auction for an impression opportunity and the content manager device provides the bid request to the ensemble performance modeling system 102.

Additionally, the acts described herein may be performed in a different order, may be repeated or performed in parallel with one another, or may be performed in parallel with different instances of the same or similar acts. For example, although FIG. 3 illustrates the acts 328 and 330 in a particular order, the ensemble performance modeling system 102 can perform the act 330 before the act 328 or skip the act 330. Similarly, the ensemble performance modeling system 102 can update the parent performance learning model and/or child parent performance learning model (as described in greater detail in FIGS. 4, 5). Furthermore, although FIG. 3 utilizes a keyword, the ensemble performance modeling system 102 can utilize any bidding parameter to determine a performance metric for an impression opportunity/bid request.

As mentioned above, the ensemble performance modeling system 102 can train and implement different performance models during different phases (i.e., at different times). For example, FIG. 4 illustrates a process diagram illustrating a series of acts by which the ensemble performance modeling system 102 determines a performance metric for a bid request in accordance with one or more embodiments.

Figure 4:
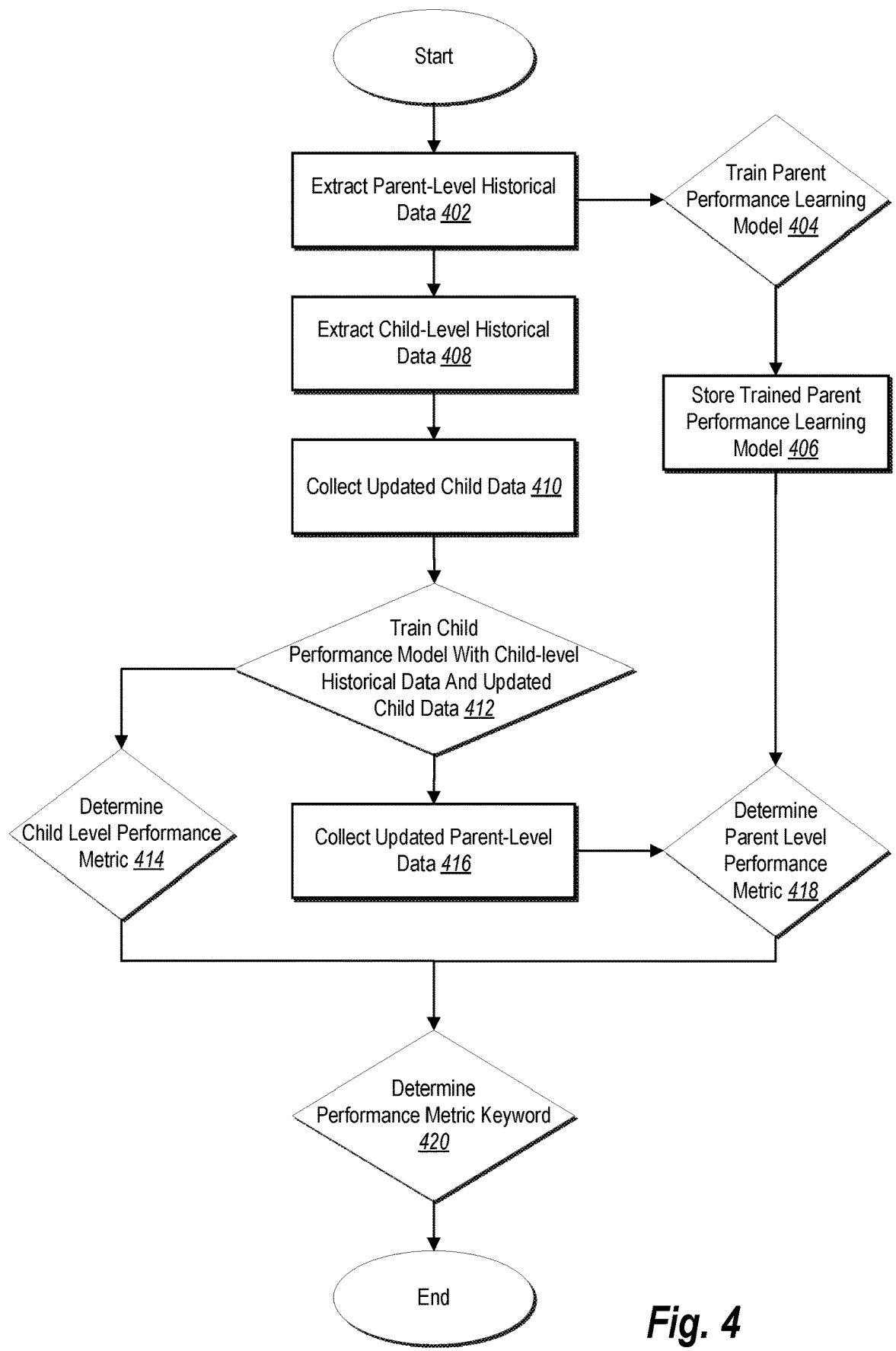
FIG. 4 illustrates a sequence diagram of determining a performance metric associated with a child keyword in accordance with one or more embodiments.

As shown in FIG. 4, the ensemble performance modeling system 102 performs the act 402 of extracting parent-level historical data (e.g., as described in relation to FIG. 2). In one or more embodiments, the ensemble performance modeling system 102 extracts parent-level historical data in response to a received bid request from a content manager device. Additionally or alternatively, the ensemble performance modeling system 102 can perform the act 402 automatically in response to the passing of a threshold amount of time. Additionally or alternatively, the ensemble performance modeling system 102 can perform the act 402 in response to determining that the parent-level historical data has changed beyond a threshold point (e.g., due to the addition of further data entries).

In one or more embodiments, the ensemble performance modeling system 102 performs the act 402 by identifying a parent bidding parameter and a child bidding parameter. The ensemble performance modeling system 102 can identify a child bidding parameter from a bid request/impression opportunity, from historical performance data (e.g., previous bid requests), or based on user input (e.g., selection of child parameter from a content manager device). The ensemble performance modeling system 102 can also identify a parent bidding parameter based on a bid request/impression opportunity, from historical performance data (e.g., previous bid requests), or based on user input (e.g., selection of a parent bidding parameter from a content manager device). Further, the ensemble performance modeling system can identify a parent bidding parameter based on the child bidding parameter (e.g., identify a parent bidding parameter that is broader than the child bidding parameter). In one or more embodiments, a content manager device can select and modify the child bidding parameter and/or the parent bidding parameter.

After identifying the parent bidding parameter within the digital content campaign, the ensemble performance modeling system 102 extracts the parent-level historical data associated with the parent bidding parameter. As discussed above with reference to FIG. 2, the ensemble performance modeling system 102 can monitor and maintain historical performance data associated with each bidding parameter. The ensemble performance modeling system 102 can extract historical performance data associated with the parent bidding parameter including, but not limited to, number of clicks associated with the parent bidding parameter, conversions associated with the parent bidding parameter, and revenue associated with the parent bidding parameter. In at least one embodiment, the parent-level historical data associated with the parent bidding parameter includes the same historical performance data associated with each child bidding parameter of the parent bidding parameter. In some embodiments, the historical performance data associated with the parent bidding parameter also includes additional metadata associated with the parent bidding parameter and each of the child bidding parameters associated with the parent bidding parameter.

After extracting the historical performance data associated with the parent bidding parameter, the ensemble performance modeling system 102 utilizes the extracted data to perform the act 404 of training a parent performance learning model. As mentioned above, the ensemble performance modeling system 102 utilizes a parent performance learning model in connection with the extracted data to output performance predictions that are stable (although perhaps not specific to the child bidding parameter associated with a particular bid request). In one or more embodiments, the parent performance learning model is a complex model such as, but not limited to, a regularized linear regression, a decision tree, or a deep learning model.

For example, if the parent performance learning model is a regularized linear regression, the ensemble performance modeling system 102 can train the parent performance learning model (at the act 404) by utilizing the extracted data to determine one or more non-zero coefficients of its features. In another example, if the parent performance learning model is a deep learning model, the ensemble performance modeling system 102 can train the parent performance learning model by utilizing the extracted data to determine one or more line weights associated with nodes across the layers of the deep learning model.

In one or more embodiments and after training the parent performance learning model, the ensemble performance modeling system 102 performs the act 406 of storing the trained parent performance learning model. For example, the ensemble performance modeling system 102 performs the act 406 by storing the features (e.g., the non-zero coefficients, the line weights) of the trained parent performance learning model.

Furthermore, following (or before or concurrent with) training the parent performance learning model, the ensemble performance modeling system 102 performs the act 408 of extracting child-level historical data. For example, as just described (in relation to the act 402) the ensemble performance modeling system 102 identifies a child bidding parameter. In at least one embodiment, the ensemble performance modeling system 102 then extracts child-level historical data associated with the child bidding parameter (as described in relation to FIG. 2). For example, the historical performance data associated with the bidding parameter can include, but is not limited to, number of clicks for impression opportunities associated with the child bidding parameter, conversions from impression opportunities associated with the child bidding parameter, and revenue from impression opportunities associated with the child bidding parameter.

Figure 5:
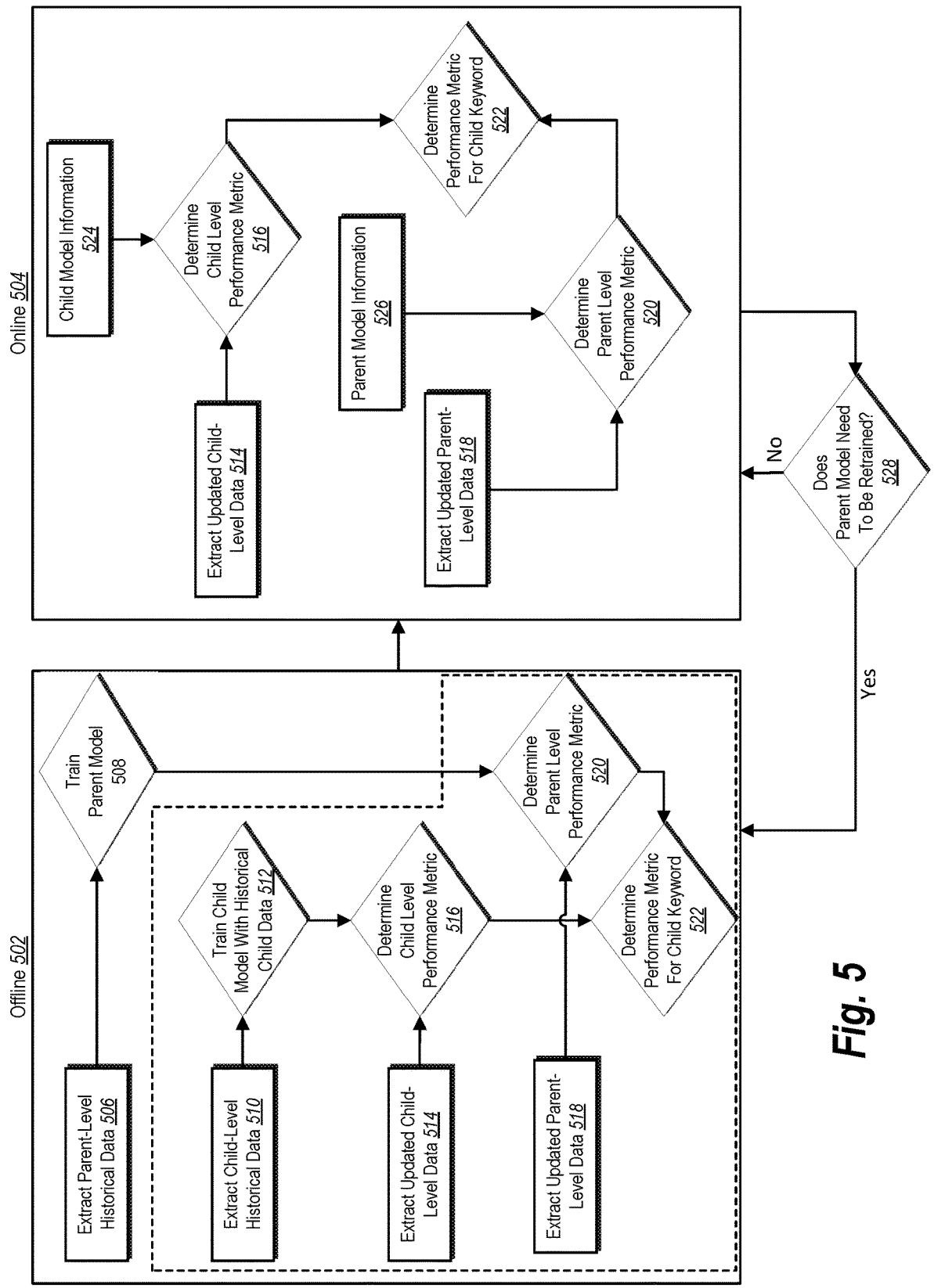
FIG. 5 illustrates a sequence diagram of determining performance metrics in online and offline modes ensemble performance modeling system in accordance with one or more embodiments.

As described in greater detail in FIG. 5, the ensemble performance modeling system 102 can perform the acts 402-408 (or only the acts 402-406) as part of an offline phase. For example, the ensemble performance modeling system 102 can perform the acts 402-408 prior to receiving a request for a performance metric and/or prior to executing a digital content campaign. As further illustrated, in FIG. 4 the ensemble performance modeling system 102 can perform the acts 410-420 during an online phase. For example, the ensemble performance modeling system 102 can perform the acts 410-420 in response to a request for a performance metric (e.g., in response to a bid request). Similarly, the ensemble performance modeling system 102 can perform the acts 410-420 while operating a digital content campaign in real-time.

As shown in FIG. 4, the ensemble performance modeling system 102 also performs the act 410 of collecting updated child-level data. In one or more embodiments, the ensemble performance modeling system 102 monitors and stores performance data periodically, such that there is a gap between data stored as child-level historical performance data and the most updated performance data collected for the child bidding parameter. Accordingly, the ensemble performance modeling system 102 collects updated child-level data for inclusion in the determination of a child-level performance metric.

Moreover, as illustrated in FIG. 4, the ensemble performance modeling system 102 also performs the act 412 of training a child performance learning model with the extracted child-level historical data and the updated child-level data. In one or more embodiments, because the child-level historical data (and updated data) associated with the child bidding parameter is sparse, the ensemble performance modeling system 102 trains a child performance learning model that is non-complex. For example, the child performance learning model can be a historical average or a weighted average. As such, the ensemble performance modeling system 102 runs the child performance learning model with the extracted child-level historical data and/or the updated child-level data associated with the child bidding parameter and stores the model result.

As shown in FIG. 4, the ensemble performance modeling system 102 can also perform the act 414 of determining the child-level performance metric. In one or more embodiments, the ensemble performance modeling system 102 performs the act 414 as part of the act 412 (e.g., training the child performance learning model results in a performance metric). In other embodiments, the ensemble performance modeling system 102 can determine the child-level performance metric based on output by applying the trained child performance learning model to historical data and the updated child data separately and then combining the results. For example, if the performance metric is revenue-per-clicks, the ensemble performance modeling system 102 can determine the child-level performance metric by averaging the historical revenue-per-clicks and the most updated revenue-per-clicks. In other embodiments, the ensemble performance modeling system 102 can determine the child-level performance metric by utilizing the result from the child performance learning model and the updated child bidding parameter data in connection with a different mathematical application, a machine learning model, or so forth.

In addition, as shown in FIG. 4, the ensemble performance modeling system 102 also performs the act 416 of collecting updated parent-level data. As discussed above with reference to the child bidding parameter, the ensemble performance modeling system 102 collects updated parent-level data in order to determine a parent-level performance metric that is more accurate than a parent-level performance metric determined on parent-level historical data alone. In one or more embodiments, the ensemble performance modeling system 102 extracts updated parent-level data that mirrors the historical parent bidding parameter utilized in training the parent performance learning model (at the act 404). For example, if the parent performance learning model was trained utilizing historical revenue-per-click data, the ensemble performance modeling system 102 can collect updated revenue-per-click data for recent impression opportunities corresponding to the parent bidding parameter.

Next, the ensemble performance modeling system 102 performs the act 418 of determining a parent-level performance metric. In one or more embodiments, the ensemble performance modeling system 102 performs the act 418 based on the stored features of the trained parent performance learning model and the updated parent-level data. For example, the ensemble performance modeling system 102 determines the parent-level performance metric by utilizing the updated parent-level data as input into a model represented by the parent performance learning model features. In at least one embodiment, the output of this model is a prediction representing the parent-level performance metric.

Ultimately, the ensemble performance modeling system 102 performs the act 420 of determining a performance metric for the child keyword based on the child-level performance metric and the parent-level performance metric. In one or more embodiments, the ensemble performance modeling system 102 can determine the performance metric for the child keyword by applying one of various types of models or algorithms to the child-level performance metric and the parent-level performance metric. For example, the ensemble performance modeling system 102 can apply a weighted average to the child-level performance metric and the parent-level performance metric in order to determine the performance metric for the child keyword. Additionally, in at least one embodiment, the ensemble performance modeling system 102 can calibrate the determined performance metric for the child keyword to obtain unbiased estimations for the historical data overall.

FIG. 5 provides additional detail regarding multiple modes in which the ensemble performance modeling system 102 can operate in accordance with one or more embodiments. As mentioned above, the ensemble performance modeling system 102 can operate in, and cycle through, an offline mode and an online mode. In one or more embodiments, the ensemble performance modeling system 102 handles time-intensive activities (e.g., complex model training) in an offline mode, and utilizes the results of those activities in connection with less time-intensive activities in an online mode. Accordingly, after an initial run through the offline mode, the ensemble performance modeling system 102 can utilize the online mode to generate bid responses in a very fast and efficient manner.

For example, as shown in FIG. 5, the ensemble performance modeling system 102 can utilize an offline mode 502 and/or an online mode 504. In one or more embodiments, the series of actions illustrated in the offline mode 502 and the online mode 504 correspond to the actions illustrated in and described with reference to FIG. 4. In at least one embodiment, and for the purposes of explanation, the offline/online cycle described with reference to FIG. 5 begins with the actions included in the offline mode 502. For instance, the ensemble performance modeling system 102 can run through the actions defined in the offline mode 502 in response to receiving a new or updated digital content campaign from a content manager (e.g., publisher or advertiser).

As shown in FIG. 5, in the offline mode 502 the ensemble performance modeling system 102 performs the act 506 of extracting parent-level historical data. As described above with reference to FIG. 4, the ensemble performance modeling system 102 extracts parent-level historical data by first identifying the parent bidding parameter of a child bidding parameter of interest within the digital content campaign. Following extraction of the parent-level historical data (at the act 506), the ensemble performance modeling system 102 performs the act 508 of training the parent performance learning model, as discussed above with reference to FIG. 4.

As illustrated in FIG. 5, in the offline mode 502, the ensemble performance modeling system 102 also performs the act 510 of extracting child-level historical data and the act 512 of training the child performance learning model with the child-level historical data. For example, in response to a new digital content campaign received from the data service 108, the ensemble performance modeling system 102 can extract child-level historical data associated with a first child bidding parameter in the digital content campaign and then iterate through every additional child bidding parameter in the digital content campaign (while in offline mode). Moreover, the ensemble performance modeling system 102 also performs the act 514 of extracting updated child-level data and utilizes the extracted updated child-level data and the result of running the child performance learning model (from the act 512) to determine the child-level performance metric (516).

The ensemble performance modeling system 102 also performs the act 518 of extracting updated parent-level data. In one or more embodiments, the ensemble performance modeling system 102 utilizes the extracted updated parent-level data in connection with stored features of the trained parent performance learning model to perform the act 520 of determining the parent-level performance metric. Specifically, the ensemble performance modeling system can update the parent performance learning model with the updated parent level-data to determine the parent-level performance metric.

In response to determining both the child-level performance metric and the parent-level performance metric, the ensemble performance modeling system 102 utilizes both metrics to determine a performance metric for the child keyword (522). As discussed above, the determined performance metric represents how well the child keyword performs relative to a specific metric. To illustrate, if the keyword associated with the bid request is "pants," and the desired performance metric is revenue-per-click, the ensemble performance modeling system 102 may determine that the keyword "pants" can be expected to perform at $0.10 per click.

In one or more embodiments, the ensemble performance modeling system 102 can utilize the performance metric to respond to a bid request. For example, the ensemble performance modeling system 102 can store the performance metric. In response to receiving a bid request, the ensemble performance modeling system 102 can utilize the performance metric to determine a bid amount and generate a bid response. For instance, the ensemble performance modeling system 102 can determine the suggested bid value by analyzing the determined performance metric against a budget and other goals associated with the content manager device that submitted the bid request. The ensemble performance modeling system 102 can also determine the suggested bid value by analyzing a bid history associated with the keyword in view of the determined performance metric. After determining a suggested bid value, the ensemble performance modeling system 102 generates a bid response including the suggested bid value and provides the bid response to the content manager device that submitted the bid request.

After initially running in offline mode 502 through a single iteration, the ensemble performance modeling system 102 can run in online mode 504 (e.g., in response to a subsequent request or in response to passage of a particular period of time). For example, in response to receiving a bid request for the same keyword and/or characteristics, the ensemble performance modeling system 102 runs in online mode 504. As shown in FIG. 5, in online mode 504, the ensemble performance modeling system 102 begins by extracting updated child-level data (514). In one or more embodiments, this extracted updated child-level data is data that has been collected in the time since the child-level performance metric was last determined.

The ensemble performance modeling system 102 then identifies child performance learning model information (524) (e.g., weights or features of a trained child performance model). For example, in at least one embodiment, the ensemble performance modeling system 102 identifies the result of running the child performance learning model with the child-level historical data (510) that was determined in offline mode 502. With the child performance learning model information (524) and the extracted updated child data (514), the ensemble performance modeling system 102 determines the child-level performance metric (516) in online mode 504.

Next, the ensemble performance modeling system 102 extracts updated parent-level data (518). As with the updated child-level data, the ensemble performance modeling system 102 extracts parent-level data that has been collected in the time that has elapsed since the last time the parent-level performance metric was determined. After extracting the updated parent-level data (518), the ensemble performance modeling system 102 identifies the parent performance model information (526). As mentioned above, the ensemble performance modeling system 102 can identify the parent performance model information (526) as the stored features of the trained parent performance model.

Following this, in online mode 504, the ensemble performance modeling system 102 utilizes the updated parent-level data and the identified parent performance model information to determine the parent-level performance metric (520). Finally, the ensemble performance modeling system 102 utilizes the child-level performance metric and the parent-level performance metric to determine the performance metric for the child keyword (522). At this point, the ensemble performance modeling system 102 can generate a bid response, as discussed above.

In one or more embodiments, the ensemble performance modeling system 102 can continue to run in online mode 504 in response to receiving bid requests associated with the same keyword and/or characteristics. In at least one embodiment, the ensemble performance modeling system 102 periodically runs in offline mode 502 in order to re-train the parent performance learning model. For example, as shown in FIG. 5, after having run in online mode 504 and in response to receiving a bid request, the ensemble performance modeling system 102 can perform the act 528 of determining whether the parent performance learning model needs to be re-trained. If the parent performance learning model does not need to be re-trained, the ensemble performance modeling system 102 can continue to run in online mode 504. If the parent performance learning model needs to be re-trained, the ensemble performance modeling system 102 can switch to offline mode 502 in order to re-train the parent performance learning model.

The ensemble performance modeling system 102 can determine whether the parent performance learning model needs to be re-trained based on several factors. For example, in one embodiment, the ensemble performance modeling system 102 can determine that the parent performance learning model needs to be re-trained every time a threshold amount of time expires (e.g., every 6 hours). In another embodiment, the ensemble performance modeling system 102 can determine that the parent performance learning model needs to be re-trained in response to determining that a threshold amount of new parent-level data has been collected. In another embodiment, the ensemble performance modeling system 102 can determine that the parent performance learning model needs to be re-trained in response to determining that there has been a statistically significant change in the parent-level performance metric (e.g., indicating a spike or dip in performance associated with the parent bidding parameter and/or its child bidding parameters).

In at least one embodiment, the ensemble performance modeling system 102 can run simultaneously in offline mode 502 and in online mode 504. For example, it is possible that the ensemble performance modeling system 102 can receive a bid request shortly after determining that the parent performance learning model needs to be re-trained (at the 528). As discussed above, re-training the parent performance learning model can be a timely process. Accordingly, in order to provide a fast bid response to the received bid request, the ensemble performance modeling system 102 can generate a bid response to the received bid request in online mode 504 while simultaneously re-training the parent performance learning model in offline mode 502.

In addition, although FIG. 5 illustrates the offline mode 502 as including the acts 506-522, in one or more embodiments, the ensemble performance modeling system 102 omits one or more of the acts 510-522 when in offline mode (as indicated by the dashed lines). For example, as described above in relation to FIG. 3 or FIG. 4, the ensemble performance modeling system 102 can perform the acts 506, 508 and then extract child-level data and train the child performance model in the online mode 504.

In one or more embodiments, the ensemble performance modeling system 102 performs the acts described in relation to FIG. 5 for a plurality of child bidding parameters. Indeed, the ensemble performance modeling system 102 can automatically perform the actions described with reference to FIGS. 4 and 5 for each child bidding parameter in a digital content campaign. Thus, in such embodiments, the ensemble performance modeling system 102 can identify the parent bidding parameter of a first child bidding parameter in the digital content campaign and then iterate through each child bidding parameter in the digital content campaign to generate predicted performance metrics for each child parameter.

The ensemble performance modeling system 102 can also be described in terms of equations and/or pseudocode that cause a computing device to perform particular functions. For example, consider an embodiment of the ensemble performance modeling system 102 that predicts performance metric of revenue-per-click, or rpc, defined as:

$$rpc = \frac{revenue}{clicks}.$$

In many circumstances, the rpcs at the bid unit level are zero-inflated and very sparse. However, one or more digital content campaigns can include structural (hierarchical) information. For example, a content manager (e.g., publisher or advertiser) can create an account and campaign. Under the campaign, the content manager can construct several ad groups and sets multiple bid units under each ad group. This structure related metadata provides a way to identify information from related bid units. For instance, the ensemble performance modeling system 102 can utilize features from a variety of sources, including the keywords, the text of the digital content (e.g., ad creatives), the ads hierarchy structure and also multiple features at the higher levels, such as geo targeting at campaign level.

If the ensemble performance modeling system 102 builds a model by pushing down all features to the bid unit level, it will lead to unstable predictions. Accordingly, the ensemble performance modeling system 102 can build two separate models at a pre-defined parent level (high level) denoted by $L_p$ and the child level (e.g., low level/bid unit level) denoted by $L_s$. The rpcs at level $L_p$ can be viewed as providing a kind of prior knowledge for the rpcs at level $L_s$. Therefore, the ensemble performance modeling system 102 can provide final ensemble predictions by combining predictions at level $L_p$ denoted by $\widehat{rpc}_{prior}$ (e.g., the parent-level performance prediction) and predictions at level $L_s$ denoted by $\widehat{rpc}_{self}$ (e.g., the child-level performance prediction). At level $L_p$, parent performance learning models (e.g., sophisticated models) denoted by F can be built using regularized linear regression, decision trees and even deep learning methods. While, at level $L_s$, due to data sparsity, child performance learning models (e.g., more simple models) denoted by G are built, like historical average, weighted average and so on. Then $\widehat{rpc}_{final}$ is generated by model E which combines the predictions given by F and G. $x_{prior}$ and $x_{self}$ denote the features used at the two level models.

$$\widehat{rpc}_{prior} = F(x_{prior})$$

$$\widehat{rpc}_{Self} = G(x_{Self})$$

In order to deal with large scale data, the ensemble performance modeling system 102 can include an offline phase and an online phase. As aforementioned, the ensemble performance modeling system 102 can include two separate models at level $L_p$ and level $L_s$ and then combine the predictions.

In one or more embodiments, the process of extracting historical data and modeling at level $L_p$ is included in the offline phase. Although the model F can be complicated, the rpcs at level $L_p$ can be more stable compared to the rpcs at level $L_s$. Thus, the ensemble performance modeling system 102 can re-train the model in a low frequency with all historical data. Once generating a well-trained model (for both the child and parent level models), the ensemble performance modeling system 102 can increase speed by storing the information of the model that is needed to give predictions. In at least one embodiment, the stored model information as FI. For example, for linear regression, FI is the non-zero coefficients of the features. The ensemble performance modeling system 102 can store the information needed for the model at level $L_s$, as explained below.

In one or more embodiments, the ensemble performance modeling system 102 generates predictions $\widehat{rpc}_{prior}$ at level $L_p$, applies simple models at level $L_s$ to obtain $\widehat{rpc}_{self}$ and combines these two level predictions to give final predictions in the online phase. For example, the ensemble performance modeling system 102 can run the online phase whenever it is needed to give predictions for each bid unit. For the model G at level $L_s$, the ensemble performance modeling system 102 applies incremental updates to give predictions quickly when new data is coming in (because the ensemble performance modeling system 102 has built simple models at this level). To further explain the incremental updates and the whole procedure of the online phase, consider time notation t to demonstrate a sequence of online phase implementations.

For instance, the ensemble performance modeling system 102 can obtain $\widehat{rpc}_{prior,t}$. In one or more embodiments, the features $x_{prior,t}$ used for model F at level $L_p$ are metadata for the bid units, thus generating the features from database is exceptionally fast. Then the ensemble performance modeling system 102 can use the stored model information FI to give predictions.

$$\widehat{rpc}_{prior,t} = F(x_{prior,t}) = P(FI, x_{prior,t})$$

Here, P represents some simple calculations which can be implemented very quickly.

The ensemble performance modeling system 102 can generate predictions $\widehat{rpc}_{self,t}$ incrementally. For instance, consider utilizing historical revenue divided by historical clicks, as an example of model G. Then $\widehat{rpc}_{self}$ at time t−1 would be $$\widehat{rpc}_{self,t-1} = G(x_{self,t-1}) = \frac{\sum_{i \leq t-1} revenue_i}{\sum_{i \leq t-1} clicks_i}.$$

The stored information could include the summations of historical revenue and clicks, denoted by GI.

$$GI_{t-1} = \{Revenue_{self,t-1}, Clicks_{self,t-1}\}, \text{ where}$$

$$Revenue_{self,t-1} \Sigma_{i \leq t-1} revenue_i; Clicks_{self,t-1} \Sigma_{i \leq t-1} clicks_i$$

At time t, the ensemble performance modeling system 102 collects new data $D_t$ with recently generated clicks and revenue since t−1, which can be done very quickly. Then, the predictions would be $$\widehat{rpc}_{self,t} = G(x_{self,t}) = \frac{Revenue_{self,t-1} + revenue_t}{Clicks_{self,t-1} + clicks_t} = Q(GI_{t-1}, D_t).$$

Here, Q represents calculations which can be implemented quickly. The initial step of calculating $GI_0$ is done in the offline phase. Here, the ensemble performance modeling system 102 transforms the features $x_{self,t}$ to $GI_t$ to realize incremental updates.

For this portion, the ensemble performance modeling system 102 can apply any of multiple methods such as simple average, weighted average by taking the number of clicks as weights and so on. A final step calibration can be used to obtain unbiased estimations for the historical data overall.

$$\widehat{rpc}_{final,t} = \Sigma(\widehat{rpc}_{prior,t}, \widehat{rpc}_{self,t})$$

The online phase can run fast and be scheduled daily, hourly, or even in real time whenever needed to provide predictions for each bid unit, while the offline phase can run in a low frequency with a long running time and will not affect the system prediction speed. The offline and online phases are independent and can be scheduled separately. However, the initial step of the system is running the offline phase, which will store the model information FI and data $GI_0$ that is needed for model G.

As discussed in relation to FIGS. 4, 5, the ensemble performance modeling system 102 can thus utilize a first performance learning model and a second performance learning model to determine a performance metric (e.g., based on a parent-level performance metric and a child-level performance metric). Accordingly, the algorithms and acts described in relation to FIGS. 4, 5 can comprise corresponding structure for a step for utilizing a first performance learning model and a second performance learning model to determine a parent-level performance metric and a child-level performance metric.

As mentioned above, the ensemble performance modeling system 102 can improve accuracy and efficiency of conventional systems. In one or more embodiments, experimenters compared the model accuracy and runtime of a conventional revenue model applied in Adobe Media Optimizer (AMO) and the ensemble performance modeling system 102. Table 1 and Table 2 show the comparison of 6 samples from AMO clients. Experimenters tested the model accuracy and runtime for a month. The daily model prediction error is defined as $$error_t = \left| \frac{revenue_t - \widehat{rpc}_t * clicks_t}{\widehat{rpc}_t * clicks_t} \right| * 100\%.$$

Table 1 contains the average daily error for the current model and the ensemble performance modeling system 102. For the proposed model, experimenters built a regression model as the high level model and applied the model mentioned above as the low level model (historical revenue divided by historical clicks as predicted rpcs). More features can be added in the high level model compared with the current revenue model due to the model and time flexibility. As shown in Table 1, the example embodiment of the ensemble performance modeling system 102 reduces the error about 6% in average. For model runtime, in the conventional revenue model, historical data is extracted, and model is trained each time there is a request for rpc predictions. In the proposed learning system, only the online phase is triggered in response to a request for performance predictions. Table 2 shows the proposed learning system improves the model speed about 90% in average.

TABLE 1

Accuracy comparison

| Sample | Error_conv | Error_EPMS | Error_improvement |
|---|---|---|---|
| 1 | 26.83% | 19.14% | 7.69% |
| 2 | 29.40% | 18.44% | 10.96% |
| 3 | 13.60% | 8.76% | 4.84% |
| 4 | 31.20% | 28.50% | 2.70% |
| 5 | 10.59% | 9.13% | 1.46% |
| 6 | 24.39% | 14.92% | 9.47% |

TABLE 2

Runtime comparison

| Sample | Time_conv (sec) | Time_EPMS (sec) | Time_improvement |
|---|---|---|---|
| 1 | 372.81 | 19.80 | 94.69% |
| 2 | 363.19 | 20.18 | 94.44% |
| 3 | 194.38 | 15.93 | 91.80% |
| 4 | 96.88 | 12.04 | 87.57% |
| 5 | 118.49 | 15.20 | 87.17% |
| 6 | 141.99 | 18.96 | 86.65% |

Accordingly, the ensemble performance modeling system 102 can utilize a two-level learning approach to capture the information available at bid unit level and other related knowledge at higher levels, which provides a vertical learning process through campaign hierarchy. The ensemble performance modeling system 102 avoids loss of information as well as data sparsity issues. Scalability of the system can be ensured by building models at different phases. In particular, the high level model can be built in the offline phase which can be scheduled in a low frequency. The low level model can be updated in the online phase (at higher frequency). Then the ensemble predictions can be generated in real time. The ensemble performance modeling system 102 is thus suitable for learning problems with large-scale streaming data.

Figure 6:
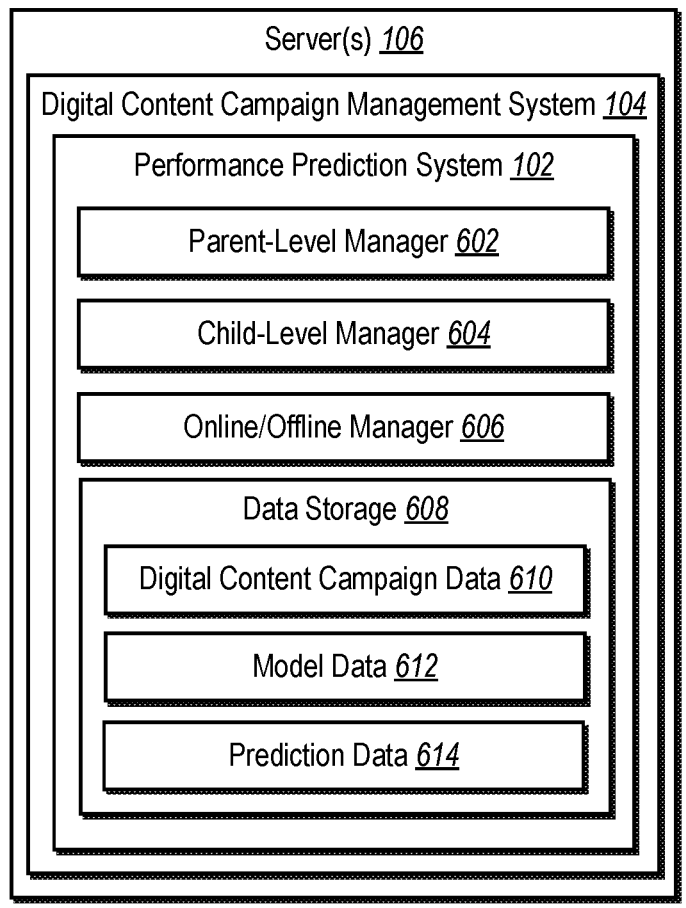
FIG. 6 illustrates a schematic diagram of the ensemble performance modeling system in accordance with one or more embodiments.

FIG. 6 illustrates an example architecture for the ensemble performance modeling system 102. For example, as shown in FIG. 6, the ensemble performance modeling system 102 is maintained by the digital content campaign management system 104 on the server(s) 106. In one or more embodiments, the ensemble performance modeling system 102 includes a parent-level manager 602, a child-level manager 604, an online/offline manager 606, and a data storage 608 including digital content campaign data 610, model data 612, and prediction data 614.

Although the disclosure herein shows the components 602-614 to be separate in FIG. 6, any of the components 602-614 may be combined into fewer components, such as into a single facility of module, or divided into more components as may serve one or more embodiments. In addition, the components 602-614 may be located on, or implemented by, one or more computing devices, such as those described below in relation to FIG. 8.

In one or more embodiments, the components 602-614 comprise software, hardware, or both. For example, the components 602-614 can comprise computing instructions stored on a non-transitory computer-readable storage medium and executable by the server(s) 106. When executed by the at least one processor, the computer-executable instructions cause the server(s) 106 to perform the methods and processes described herein. Alternatively, the components 602-614 can comprise hardware, such as a special purpose processing device to perform a certain function or group of functions. Additionally, the components 602-614 can comprise a combination of computer-executable instructions and hardware.

As mentioned above, and as shown in FIG. 6, the ensemble performance modeling system 102 includes the parent-level manager 602. In one or more embodiments, the parent-level manager 602 handles all activities in the process for generating a bid response that involve a parent bidding parameter. For example, the parent-level manager 602 identifies a parent bidding parameter of a child bidding parameter associated with a keyword and/or characteristics laid out in a bid request (or digital content campaign). Additionally, the parent-level manager 602 extracts parent-level historical data and updated parent-level data, as discussed above. Furthermore, the parent-level manager 602 trains and runs the parent performance learning model to determine a parent-level performance metric, as discussed above.

As mentioned above, and as shown in FIG. 6, the ensemble performance modeling system 102 includes the child-level manager 604. In one or more embodiments, the child-level manager 604 handles all activities in the process for generating a bid response that involve a child bidding parameter. For example, the child-level manager 604 identifies a bidding parameter within a digital content campaign that corresponds to the keyword and/or characteristics laid out in a bid request. Additionally, the child-level manager 604 extracts child-level historical data and updated child-level data, as discussed above. Furthermore, the child-level manager 604 utilizes the child performance learning model to determine a child-level performance metric, as discussed above.

As mentioned above, and as shown in FIG. 6, the ensemble performance modeling system 102 includes the online/offline manager 606. In one or more embodiments, the online/offline manager 606 determines whether the ensemble performance modeling system 102 should be running in online mode or offline mode and directs the parent-level manager 602 and the child-level manager 604 in performing the activities described with regard to FIGS. 4 and 5. Additionally, the online/offline manager 606 receives bid requests, determines suggested bid amounts based on performance metrics for a keyword and/or characteristics laid out in a bid request, and generates bid responses including the suggested bid amounts.

Also, as mentioned above, the ensemble performance modeling system 102 includes a data storage 608. The data storage 608 stores and maintains digital content campaign data 610 representative of digital content campaign information. The data storage 608 also stores and maintains model data 612 representative of model information such as parent performance model information and child performance model information. Furthermore, the data storage 608 stores and maintains prediction data 614 representative of prediction information such as performance predictions, suggested bid amounts, and generated bid responses.

Figure 7:
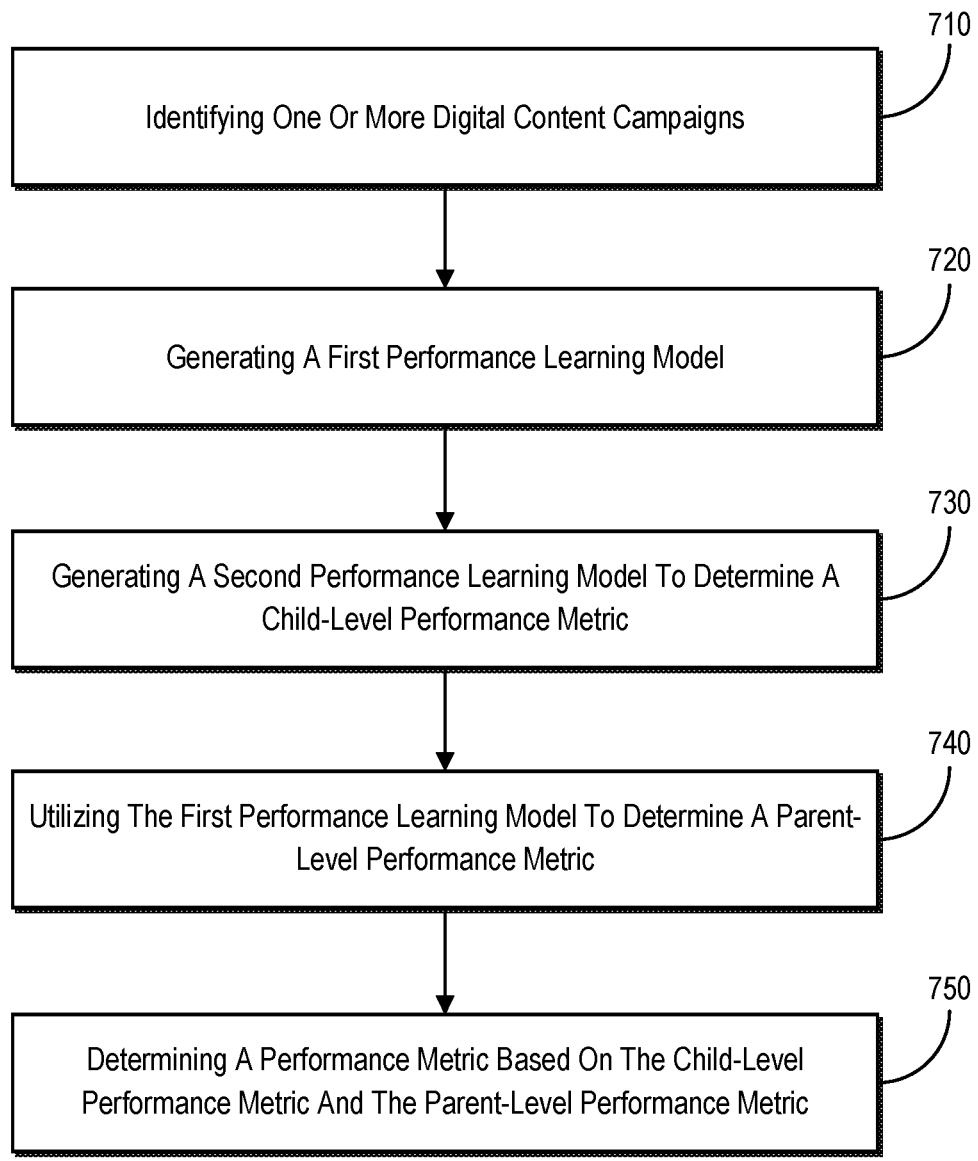
FIG. 7 illustrates a flowchart of a series of acts for determining a performance metric utilizing multiple learning models in accordance with one or more embodiments.

Turning now to FIG. 7, this figure illustrates a flowchart of a series of acts 700 of determining a performance metric corresponding to a child parameter in accordance with one or more embodiments described herein. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer-readable medium can comprise instructions, that when executed by one or more processors, cause a computing device to perform the acts of FIG. 7. In still further embodiments, a system can perform the acts of FIG. 7.

As shown in FIG. 7, the series of acts 700 includes an act 710 of identifying one or more digital content campaigns. For example, the act 710 can involve identifying one or more digital content campaigns comprising a parent parameter and a child parameter.

The series of acts 700 further includes an act 720 of generating a first performance learning model. For example, the act 720 can involve generating a first performance learning model based on parent-level historical data corresponding to the parent parameter. In one or more embodiments, the parent-level historical data corresponding to the parent parameter comprises historical performance data associated with the parent parameter and a plurality of child parameters associated with the parent parameter within the one or more digital content campaigns.

Additionally, the series of acts 700 includes an act 730 of generating a second performance learning model to determine a child-level performance metric. For example, the act 730 can involve, in response to receiving a request corresponding to an impression opportunity associated with the child parameter, generating a second performance learning model based on child-level historical data associated with the child parameter to determine a child-level performance metric. In one or more embodiments, the parent parameter comprises a parent keyword, the child parameter comprises a child keyword of the parent keyword, and the impression opportunity corresponds to a search query utilizing the child keyword.

The series of acts 700 also includes an act 740 of utilizing the first performance learning model to determine a parent-level performance metric. For example, the act 740 can involve, in response to receiving a request corresponding to an impression opportunity associated with the child parameter, utilizing the first performance learning model to determine a parent-level performance metric. In one or more embodiments, the parent-level performance metric is determined based on the parent-level historical data and updated data associated with the parent parameter, and the child-level performance metric is determined based on the child-level historical data and updated data associated with the child parameter.

Moreover, the series of acts 700 includes an act 750 of determining a performance metric based on the child-level performance metric and the parent-level performance metric. For example, the act 750 can involve, in response to receiving a request corresponding to an impression opportunity associated with the child parameter, determining a performance metric corresponding to the child parameter based on the child-level performance metric and the parent-level performance metric.

In one or more embodiments, the series of acts 700 further includes a step of receiving the request corresponding to the impression opportunity as part of a bid request from a remote server. Additionally, the series of acts 700 can include a step of, in response to determining the performance metric corresponding to the child parameter, generating a bid response based on the performance metric. For example, in at least one embodiment, generating the bid response comprises: determining, based on the performance metric, a suggested bid amount corresponding to the child parameter, generating the bid response comprising the suggested bid amount, and providing the bid response to a remote server for providing to a client device of a user.

In some embodiments, the series of acts 700 includes additional steps of identifying an additional child parameter in the one or more digital content campaigns. The series of acts 700 can also include the step of modifying the first performance learning model based on additional historical performance data associated with the additional child parameter.

In at least one embodiment, the series of acts 700 includes an act of, in response to receiving a request corresponding to a second impression opportunity corresponding to the child parameter, updating the child-level historical data associated with the child parameter to include updated data associated with the child parameter. In that embodiment, the series of acts 700 further includes acts of modifying the second performance learning model based on the updated child-level historical data associated with the child parameter to determine a second child-level performance metric, utilizing the modified first performance learning model to determine a second parent-level performance metric, and determining a second performance metric corresponding to the child parameter based on the second child-level performance metric and the second parent-level performance metric.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
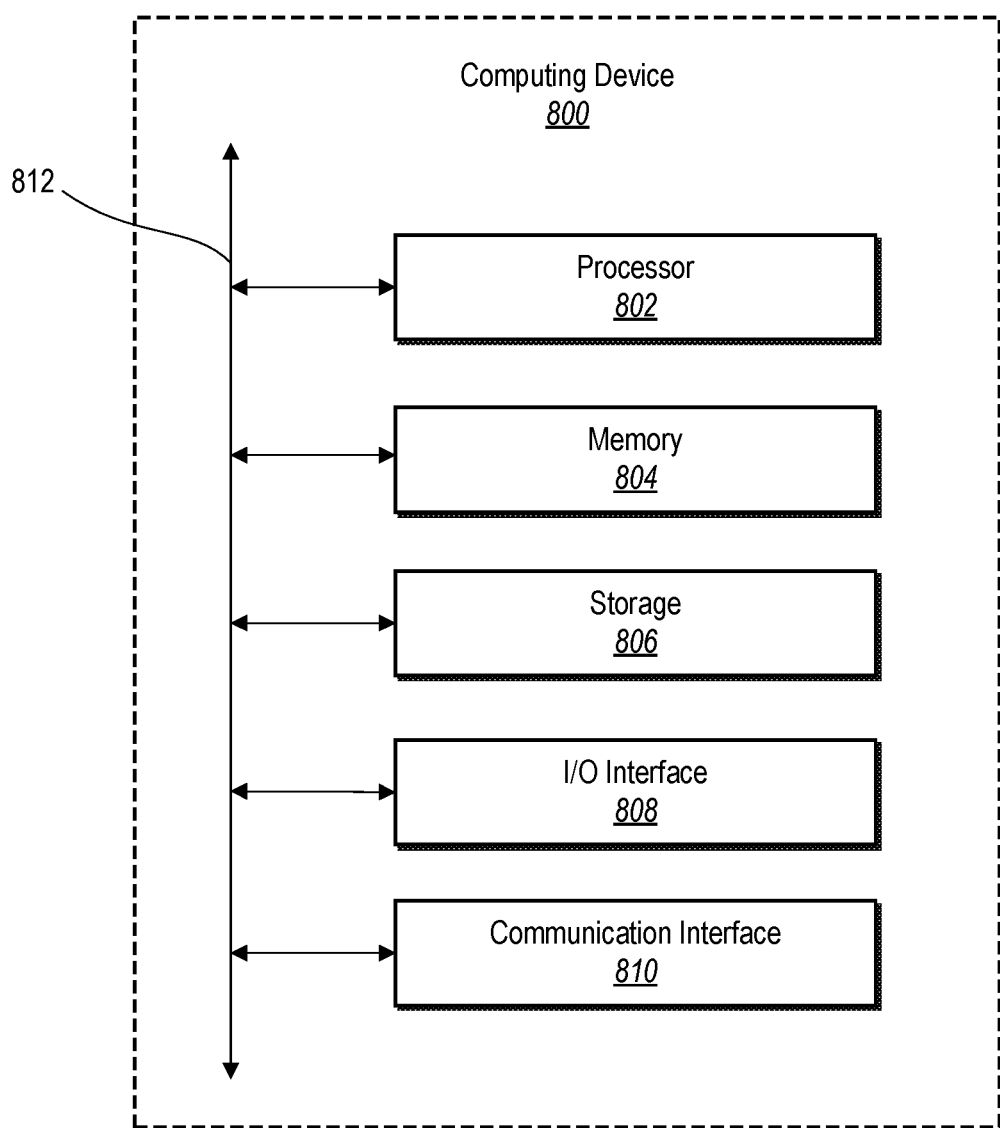
FIG. 8 illustrates a block diagram of an exemplary computing device in accordance with one or more embodiments.

FIG. 8 illustrates, in block diagram form, an exemplary computing device 800 that may be configured to perform one or more of the processes described above. One will appreciate that the ensemble performance modeling system 102 can be implanted on implementations of the computing device 800. As shown by FIG. 8, the computing device can comprise a processor 802, memory 804, a storage device 806, an I/O interface 808, and a communication interface 810. In certain embodiments, the computing device 800 can include fewer or more components than those shown in FIG. 8. Components of computing device 800 shown in FIG. 8 will now be described in additional detail.

In particular embodiments, processor(s) 802 includes hardware for executing instructions, such as those making up a computer program. As an example, and not by way of limitation, to execute instructions, processor(s) 802 may retrieve (or fetch) the instructions from an internal register, an internal cache, memory 804, or a storage device 806 and decode and execute them.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 804 may be internal or distributed memory. In one or more embodiments, the memory 804 stores or comprises the data storage.

The computing device 800 includes a storage device 806 includes storage for storing data or instructions. As an example, and not by way of limitation, storage device 806 can comprise a non-transitory storage medium described above. The storage device 806 may include a hard disk drive (HDD), flash memory, a Universal Serial Bus (USB) drive or a combination of these or other storage devices. In one or more embodiments, the storage device 806 stores or comprise the data storage.

The computing device 800 also includes one or more input or output ("I/O") devices/interfaces 808, which are provided to allow a user to provide input to (such as user strokes), receive output from, and otherwise transfer data to and from the computing device 800. These I/O devices/interfaces 808 may include a mouse, keypad or a keyboard, a touch screen, camera, optical scanner, network interface, modem, other known I/O devices or a combination of such I/O devices/interfaces 808. The touch screen may be activated with a stylus or a finger.

The I/O devices/interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 808 is configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 can provide one or more interfaces for communication (such as, for example, packet-based communication) between the computing device and one or more other computing devices 800 or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can comprise hardware, software, or both that couples components of computing device 800 to each other.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps or acts or the steps or acts may be performed in differing orders. Additionally, the steps or acts described herein may be repeated or performed in parallel with one another or in parallel with different instances of the same or similar steps or acts. The scope of the present application is, therefore, indicated by the appended claims rather than by the foregoing description. All changes that come within the meaning and range of equivalency of the claims are to be embraced within their scope.

We claim:

1. In a digital medium environment for real-time bidding on impression opportunities corresponding to client computing devices of users navigating to digital assets, a method for utilizing multi-phase learning models to generate bid responses and provide digital assets to select client devices, the method comprising:

identifying, utilizing at least one server device, one or more digital content campaigns comprising a parent keyword and a child keyword, wherein the child keyword comprises an example of the parent keyword;

generating a high-complexity performance learning model, via the at least one server device in an offline mode prior to receiving a request corresponding to an impression opportunity of a client device associated with the child keyword, based on parent-level historical data corresponding to the parent keyword by utilizing the parent-level historical data to tune weights of the high-complexity performance learning model at a first frequency; and in response to receiving the request corresponding to the impression opportunity of the client device associated with the child keyword, utilizing the at least one server to:

identify a low-complexity performance learning model corresponding to the child keyword generated based on child-level historical data corresponding to the child keyword by determining one or more averages across the child-level historical data, the child-level historical data having a sparse population relative to the parent-level historical data;

identify, in an online mode and after generating the high-complexity performance learning model, updated child-level data corresponding to the child keyword;

update, in the online mode and at a second frequency higher than the first frequency, the low-complexity performance learning model based on the updated child-level historical data corresponding to the child keyword;

utilize the updated low-complexity performance learning model to determine a child-level performance metric for the impression opportunity of the client device associated with the child keyword;

utilize the high-complexity performance learning model to determine a parent-level performance metric for the impression opportunity of the client device associated with the child keyword;

utilize the child-level performance metric determined by the updated low-complexity performance learning model and the parent-level performance metric determined by the high-complexity performance learning model to determine a performance metric corresponding to the child keyword; and transmit, utilizing the performance metric corresponding to the child keyword, a response comprising a digital bid corresponding to the impression opportunity of the client device.

2. The method as recited in claim 1, further comprising, in response to receiving an additional request corresponding to an additional impression opportunity of an additional client device associated with the child keyword, utilizing the at least one server to:

identify further updated child-level data corresponding to the child keyword; and modify the updated low-complexity performance learning model utilizing the further updated child-level data corresponding to the child keyword.

3. The method as recited in claim 2, further comprising:

determining, utilizing the modified low-complexity performance learning model, an additional child-level performance metric for the additional impression opportunity of the additional child device; and utilizing the additional child-level performance metric and one or more parent-level performance metrics determined by the high-complexity performance learning model to determine an additional performance metric corresponding to the child keyword.

4. The method as recited in claim 1, further comprising:

storing, in the offline mode, the tuned weights of the high-complexity performance learning model;

accessing, in the online mode, the tuned weights of the high-complexity performance learning model; and utilizing the tuned weights of the high-complexity performance learning model, in the online mode, to determine the parent-level performance metric.

5. The method as recited in claim 1, further comprising generating the high-complexity performance learning model by training a performance neural network utilizing the parent-level historical data by back-propagating to determine one or more line weights associated with nodes of the performance neural network.

6. A non-transitory computer-readable storage medium having stored thereon computer-executable instructions that, when executed by a processor, cause a computing device to:

identify one or more digital content campaigns comprising a parent parameter and a child parameter, wherein the parent parameter subsumes the child parameter;

generate, in an offline mode prior to receiving a request corresponding to an impression opportunity of a client device associated with a child parameter, a high-complexity performance learning model at a first frequency based on parent-level historical data corresponding to the parent parameter by utilizing the parent-level historical data to tune weights of the high-complexity performance learning model; and in response to receiving the request corresponding to the impression opportunity of the client device associated with the child parameter:
identify a low-complexity performance learning model corresponding to the child parameter generated based on child-level historical data, the child-level historical data having a sparse population relative to the parent-level historical data;
identify, in an online mode and after generating the high-complexity performance learning model, updated child-level data corresponding to the child parameter;
update, in the online mode and at a second frequency higher than the first frequency, the low-complexity performance learning model based on the updated child-level historical data associated with the child parameter;
utilize the updated low-complexity performance learning model to determine a child-level performance metric for the impression opportunity of the client device associated with the child parameter;
utilize the high-complexity performance learning model to determine parent-level performance metric for the impression opportunity of the client device associated with the child parameter;
utilize the child-level performance metric determined by the updated low-complexity performance learning model and the parent-level performance metric determined by the high-complexity performance learning model to determine a performance metric corresponding to the child parameter; and
transmit, utilizing the performance metric corresponding to the child parameter, a response comprising a digital bid corresponding to the impression opportunity of the client device.

7. The non-transitory computer-readable medium as recited in claim 6, wherein the parent parameter comprises a parent keyword, the child parameter comprises a child keyword of the parent keyword, and the impression opportunity corresponds to a search query utilizing the child keyword.

8. The non-transitory computer-readable medium as recited in claim 6, further comprising computer-executable instructions that, when executed by the processor, cause the computing device to generate the high-complexity performance learning model by training at least one of a linear regression model or a neural network.

9. The non-transitory computer-readable medium as recited in claim 8, further comprising computer-executable instructions that, when executed by the processor, cause the computing device to:
generate the low-complexity performance learning model utilizing the child-level historical data;
after generating the low-complexity performance learning model, monitor user interactions corresponding to the child parameter across client devices to determine the updated child-level historical data; and
update the low-complexity performance learning by determining an updated average metric utilizing the updated child-level historical data.

10. The non-transitory computer-readable medium as recited in claim 6, further comprising computer-executable instructions that, when executed by the processor, cause the computing device to:
identify an additional child parameter in the one or more digital content campaigns; and
modify the high-complexity performance learning model based on additional historical performance data associated with the additional child parameter.

11. The non-transitory computer-readable medium as recited in claim 10, further comprising computer-executable instructions that, when executed by the processor, cause the computing device to, in response to receiving a request corresponding to a second impression opportunity corresponding to the child parameter in the online mode:
modify the updated low-complexity performance learning model based on additional updated child-level data associated with the child parameter;
modify the high-complexity performance learning model based on updated recent parent-level data associated with the parent parameter;
utilize the modified high-complexity performance learning model to determine a second parent-level performance metric;
utilize the modified low-complexity performance learning model to determine a second child-level performance metric; and
utilize the second child-level performance metric and the second parent-level performance metric to determine a second performance metric corresponding to the child parameter.

12. The non-transitory computer-readable medium as recited in claim 11, wherein the parent-level historical data corresponding to the parent parameter comprises historical performance data associated with a parent keyword and a plurality of child keywords associated with the parent keyword within the one or more digital content campaigns.

13. The non-transitory computer-readable medium as recited in claim 12, further comprising computer-executable instructions that, when executed by the processor, cause the computing device to:
store, in the offline mode, the tuned weights of the high-complexity performance learning model;
access, in the online mode, the tuned weights of the high-complexity performance learning model; and
utilize the tuned weights of the high-complexity performance learning model, in the online mode, to determine the parent-level performance metric.

14. A system comprising:
at least one processor; and
at least one non-transitory computer-readable storage medium storing instructions thereon that, when executed by the at least one processor, cause the system to:
identify a digital content campaign comprising a parent keyword and a child keyword of the parent keyword;
in an offline mode prior to execution of the digital content campaign in response to receiving a request corresponding to an impression opportunity of a client device associated with a child parameter:
generate a high-complexity performance learning model at a first frequency based on parent-level historical data corresponding to the parent keyword by utilizing the parent-level historical data to tune weights of the high-complexity performance learning model; and while executing the digital content campaign in response to receiving the request corresponding to the impression opportunity of the client device associated with the child parameter:
  identify a low-complexity performance learning model corresponding to the child parameter generated based on child-level historical data by determining one or more averages across the child-level historical data, the child-level historical data having a sparse population relative to the parent-level historical data;
  identify, in an online mode and after generating the high-complexity performance learning model, updated child-level data corresponding to the child parameter;
  update, in the online mode and at a second frequency higher than the first frequency, the low-complexity performance learning model based on the updated child-level historical data corresponding to the child keyword;
  utilize the updated low-complexity performance learning model to determine a child-level performance metric for the impression opportunity of the client device associated with the child keyword;
  utilize the high-complexity performance learning model to determine parent-level performance metric for the impression opportunity of the client device associated with the child parameter;
  utilize the child-level performance metric determined by the updated low-complexity performance learning model and the parent-level performance metric determined by the high-complexity performance learning model to determine a performance metric corresponding to the child keyword; and
  transmit, utilizing the performance metric corresponding to the child parameter, a response comprising a digital bid corresponding to the impression opportunity of the client device.

15. The system as recited in claim 14, further storing instructions thereon that, when executed by the at least one processor, cause the system to execute the digital content campaign by:
  receiving, from a remote server, a bid request corresponding to an impression opportunity associated with a search query from a client device of a user, the search query comprising the child keyword; and
  in response to receiving the bid request, and while executing the digital content campaign in the online mode:
    utilize the child-level performance metric and the parent-level performance metric to determine the performance metric corresponding to the child keyword; and
    generate a bid response based on the performance metric.

16. The system as recited in claim 15, further storing instructions thereon that, when executed by the at least one processor, cause the system to generate the bid response by:
  determining, based on the performance metric, a suggested bid amount corresponding to the impression opportunity associated with the search query comprising the child keyword;
  generate the bid response comprising the suggested bid amount; and
  provide the bid response to the remote server for providing digital content to the client device of the user.

17. The system as recited in claim 16, further storing instructions thereon that, when executed by the at least one processor, cause the system to:
  identify an additional child keyword of the parent keyword in the digital content campaign; and
  modify the high-complexity performance learning model based on historical performance data associated with the additional child keyword.

18. The system as recited in claim 17, further storing instructions thereon that, when executed by the at least one processor, cause the system to, during execution of the digital content campaign in the online mode:
  modify the low-complexity performance learning model based on additional updated child-level data associated with the child keyword;
  modify the high-complexity performance learning model based on additional updated parent-level data associated with the parent keyword;
  utilize the modified high-complexity performance learning model to determine a second parent-level performance metric;
  utilize the modified low-complexity performance learning model to determine a second child-level performance metric; and
  utilize the second child-level performance metric and the second parent-level performance metric to determine a second performance metric corresponding to the child keyword.

19. The system as recited in claim 18, wherein the performance metric corresponding to the child keyword comprises a predicted client device interaction with digital content provided to the client device via the impression opportunity.

20. The system as recited in claim 19, wherein:
  the high-complexity performance learning model is a machine-learning model tuned based on parent-level historical data to generate parent-level performance metrics.

* * * * *